United States Patent
Adams et al.

(10) Patent No.: US 8,732,115 B1
(45) Date of Patent: *May 20, 2014

(54) MEASURING SENSITIVITY OF A FACTOR IN A DECISION

(71) Applicant: Decision Lens, Inc., Arlington, VA (US)

(72) Inventors: William James Louis Adams, DeLand, FL (US); Daniel Lowell Saaty, Falls Church, VA (US)

(73) Assignee: Decision Lens, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/764,010

(22) Filed: Feb. 11, 2013

Related U.S. Application Data

(63) Continuation of application No. 12/646,289, filed on Dec. 23, 2009, now Pat. No. 8,423,500.

(51) Int. Cl.
*G06F 17/00* (2006.01)
*G06N 7/00* (2006.01)
*G06N 7/08* (2006.01)

(52) U.S. Cl.
USPC .......................................................... 706/55

(58) Field of Classification Search
USPC .......................................................... 706/55
See application file for complete search history.

(56) References Cited

U.S. PATENT DOCUMENTS

| | | |
|---|---|---|
| 5,844,817 A | 12/1998 | Lobley et al. |
| 6,151,565 A | 11/2000 | Lobley et al. |
| 6,502,126 B1 | 12/2002 | Pendakur |
| 6,643,645 B1 | 11/2003 | Fayyad et al. |
| 6,785,709 B1 | 8/2004 | Pendakur |
| 6,850,891 B1 | 2/2005 | Forman |
| 6,882,989 B2 | 4/2005 | Stevens |
| 6,907,566 B1 | 6/2005 | McElfresh et al. |
| 6,963,901 B1 | 11/2005 | Bates et al. |
| 7,080,071 B2 | 7/2006 | Henrion et al. |
| 7,203,755 B2 | 4/2007 | Zhu et al. |
| 7,257,566 B2 | 8/2007 | Danielson et al. |

(Continued)

FOREIGN PATENT DOCUMENTS

| | | |
|---|---|---|
| WO | WO 01/08070 A1 | 2/2001 |
| WO | WO 01/20530 A1 | 3/2001 |
| WO | WO 2008/057178 A2 | 5/2008 |
| WO | WO 2009/026589 A3 | 2/2009 |

OTHER PUBLICATIONS

The Analytic Hierarchy and Analytic Network Measurement Processes: Applications to Decisions under Risk Thomas L. Saaty University of Pittsburgh, Pittsburgh, PA 15260, USA.*
U.S. Appl. No. 13/764,810, filed Feb. 12, 2013, Adams et al.

(Continued)

*Primary Examiner* — Ben M Rifkin
*Assistant Examiner* — Ababacar Seck
(74) *Attorney, Agent, or Firm* — Posz Law Group, PLC

(57) ABSTRACT

An analytic network process (ANP) storage memory stores an ANP weighted supermatrix representing an ANP model. A processor is in communication with the ANP storage memory. The processor is configured to change priorities of a node in the ANP weighted supermatrix to be more important, to change priorities of the node in the ANP weighted supermatrix to be less important, and to assess a sensitivity of the node which was changed relative to the ANP model. The processor further is configured to maintain a same proportionality in the ANP weighted supermatrix for the changing of the priorities and the assessing of the relative sensitivity.

18 Claims, 5 Drawing Sheets

(56) References Cited

U.S. PATENT DOCUMENTS

| | | | |
|---|---|---|---|
| 7,353,253 B1 | 4/2008 | Zhao | |
| 7,398,257 B2 | 7/2008 | Kaji | |
| 7,542,952 B2 | 6/2009 | Yang et al. | |
| 7,552,104 B2 | 6/2009 | Hansen et al. | |
| 7,624,069 B2 | 11/2009 | Padgette | |
| 7,689,592 B2 | 3/2010 | Denton et al. | |
| 7,716,360 B2 | 5/2010 | Angelov | |
| 7,827,239 B2 | 11/2010 | Bodin et al. | |
| 7,844,670 B2 | 11/2010 | Roskowski et al. | |
| 7,996,344 B1 | 8/2011 | Goel | |
| 8,239,338 B1 | 8/2012 | Adams et al. | |
| 8,250,007 B2 | 8/2012 | Abido et al. | |
| 8,315,971 B1 | 11/2012 | Adams | |
| 8,341,103 B2 | 12/2012 | Adams et al. | |
| 8,423,500 B1 | 4/2013 | Adams et al. | |
| 8,429,115 B1 | 4/2013 | Adams et al. | |
| 8,447,820 B1 | 5/2013 | Gay | |
| 8,595,169 B1 | 11/2013 | Adams et al. | |
| 2001/0027455 A1 | 10/2001 | Abulleil et al. | |
| 2003/0069868 A1 | 4/2003 | Vos | |
| 2003/0191726 A1 | 10/2003 | Kirshenbaum | |
| 2003/0208514 A1 | 11/2003 | Yang et al. | |
| 2004/0103058 A1 | 5/2004 | Hamilton | |
| 2006/0195441 A1 | 8/2006 | Julia et al. | |
| 2006/0224530 A1 | 10/2006 | Riggs et al. | |
| 2006/0241950 A1 | 10/2006 | Hansen et al. | |
| 2007/0226295 A1 | 9/2007 | Haruna et al. | |
| 2008/0103880 A1 | 5/2008 | Saaty | |
| 2008/0104058 A1 | 5/2008 | Billmaier et al. | |
| 2008/0250110 A1 | 10/2008 | Zhao | |
| 2008/0256054 A1* | 10/2008 | Saaty | 707/5 |
| 2010/0153920 A1 | 6/2010 | Bonnet | |
| 2010/0318606 A1 | 12/2010 | Sethi et al. | |
| 2011/0022556 A1 | 1/2011 | Adams et al. | |
| 2012/0053973 A1 | 3/2012 | Elazouni et al. | |
| 2012/0133727 A1 | 5/2012 | Bolduc et al. | |
| 2013/0046718 A1 | 2/2013 | Saaty et al. | |

OTHER PUBLICATIONS

U.S. Appl. No. 13/799,077, filed Mar. 13, 2013, Adams.
U.S. Appl. No. 13/834,461, filed Mar. 15, 2013, Saaty et al.
Notice of Allowance issued by the U.S. Patent Office on Dec. 26, 2012 in connection with related U.S. Appl. No. 12/646,289.
Notice of Allowance issued by the U.S. Patent Office on Jan. 3, 2013 in connection with related U.S. Appl. No. 12/646,312.
Notice of Allowance issued by the U.S. Patent Office on Jan. 29, 2013 in connection with related U.S. Appl. No. 13/015,754.
Office Action issued by the U.S. Patent Office on May 29, 2013 in connection with related U.S. Appl. No. 13/611,544.
Notice of Allowance issued by the U.S. Patent Office on Oct. 18, 2013 in related U.S. Appl. No. 13/611,544.
Notice of Allowance issued by the U.S. Patent Office on Dec. 17, 2013 in connection with related U.S. Appl. No. 13/467,657.
Saaty, "Relative Measurement and Its Generalization in Decision Making Why Pairwise Comparisons are Central in Mathematics for the Measurement of Intangible Factors the Analytic Hierarchy/Network Process", Rev. R. Acad. Cien. Serie A. Mat., vol. 102 (2), 2008, pp. 251-318.
Buyukyazici et al. "The Analytic Hierarchy and Analytic Network Processes", Hacettepe Journal of Mathematics and Statistics, vol. 32, 2003, pp. 65-73.
Notice of Allowance issued by the U.S. Patent Office on Jun. 18, 2013 in connection with related U.S. Appl. No. 13/657,926.
Notice of Allowance issued by the U.S. Patent Office on Aug. 2, 2013 in related U.S. Appl. No. 13/290,423.
Rafiei, et al., Project Selection Using Fuzzy Group Analytic Network Process, World Academy of Science, Engineering and Technology 34 2009, pp. 457-461.
U.S. Appl. No. 12/646,289, filed Dec. 23, 2009, Adams et al.
U.S. Appl. No. 12/646,312, filed Dec. 23, 2009, Adams et al.
U.S. Appl. No. 13/015,754, filed, Jan. 28, 2011, Ryan Patrick Gay.
U.S. Appl. No. 13/290,423, filed Nov. 7, 2011, Adams et al.
U.S. Appl. No. 13/294,369, filed Nov. 11, 2011, Adams et al.
U.S. Appl. No. 13/467,657, filed May 9, 2012, Adams et al.
U.S. Appl. No. 13/611,544, filed Sep. 12, 2012, Adams et al.
U.S. Appl. No. 13/657,926, filed Oct. 23, 2012, Saaty et al.
Super Decisions Software for Decision Making, Super Decisions Website, (http://web.archive.org/web/20041202040911/http://www.superdecisions.com/ and http://www.superdecisions.com/~saaty/), 2004.
The Super Decisions Software, The Essentials of the Analytic Network Process with Seven Examples, Decision Making with Dependence and Feedback, (http://www.superdecisions.com/~saaty/Fall2005DecisionClass/PowerpointSlides/), Sep. 2005.
The Super Decisions Software, The Analytic Network Process for Decision Making with Dependence and Feedback lecture 2, Tutorial ANP BOCR (http://www.superdecisions/~saaty/Fall2005DecisionClass/PowerpointSlides/) Sep. 2005.
Decision Lens Inc., Decision Lens's Decision Lens Suite™ Product, (http://web.archive.org/web/20050204181100/www.decisionlens.com/index.php), 2004-2005.
Caterinicchia, Dan, "A problem-solving machine," *Federal Computer Week*, (Sep. 4, 2000), 14, 31, p. 48-49.
The Super Decisions Software, The Analytic Network Process, Decision Making with Dependence and Feedback, (http://www.superdecisions.com/~saaty/Fall2005DecisionClass/Powerpoint Slides/), Sep. 2005.
Mikhailov et al., "Fuzzy Analytic Network Process and its Application to the Development of Decision Support Systems," IEEE Transactions on Systems, Man, and Cybernetics—Part C: Applications and Reviews, (Feb. 2003), vol. 33, No. 1, p. 33-41.
Decision Lens, Inc., Tutorial on Hierarchical Decision Models (AHP), 2002.
Decision Lens, Inc., Tutorial on Complex Decision Models (ANP), 2002.
Rozann W. Saaty., Decision Making in Complex Environments: The Analytic Network Process (ANP) for Dependence and Feedback Including a Tutorial for the SuperDecisions Software and Portions of the Encyclicon of Application, Dec. 2002.
Rozann W. Saaty., Decision Making in Complex Environments: The Analytic Network Process (ANP) for Dependence and Feedback Including a Tutorial for the SuperDecisions Software and Portions of the Encyclicon of Application, 2005.
Decision Lens, Inc., *MS_Help_Decision_Lens*. "Welcome to Decision Lens Software™," Jun. 6, 2005.
Team Acuity, SAGD ANP Enhancement Functional Requirements Document, (Dec. 15, 2007), p. 1-68.
Decision Lens, Inc., *DLW_Help File*, Dec. 2007.
Decision Lens, Inc., *DLS_Help File*, Dec. 2007.
H. Sun., "AHP in China," International Symposium on the Analytic Hierarchy Process, (Jul. 8-10, 2003), p. 1-21.
Thomas L. Saaty., "Decision-Making with the AHP: Why is the Principal Eigenvector Necessary," International Symposium on the Analytic Hierarchy Process, (Aug. 2-4, 2001), p. 1-14.
Thomas L. Saaty., "The Analytic Network Process: Dependence and Feedback in Decision Making (Part 1) Theory and Validation Examples," International Symposium on the Analytic Hierarchy Process, (Aug. 6-11, 2004), p. 1-10.
Davolt, Steve, "The man who knew too much," *Washington Business Journal*, (Aug. 7, 2000), (http://www.bizjournals.com/washington/stories/2000/08/07/smallb1.html?t=printable).
Roxann Saaty et al., "Decision Making in Complex Environments," Super Decisions, 2003.
Feglar et al., "Dynamic Analytic Network Process: Improving Decision Support for Information and Communication Technology," ISAHP, Honolulu, Hawaii, (Jul. 8-10, 2003).
Borenstein et al., "A Multi-Criteria Model for the Justification of IT Investments," (Feb. 2005), INFOR v3nl, Canadian Operational Research Society, p. 1-21.
Condon et al., "Visualizing group decisions in the analytic hierarchy process," *Computers & Operation Research*, (2003), 30, p. 1435-1445.
D. Saaty et al., "The Future of the University of Pittsburgh Medical Center: Strategic Planning with the Analytic Network Process," Pro-

(56) References Cited

OTHER PUBLICATIONS ceedings of the Fourth International Symposium on the Analytic Hierarchy Process, (Jul. 12-15, 1996), p. 107-121.

Liming Zhu, et al., "Tradeoff and Sensitivity Analysis in Software Architecture Evaluation Using Analytic Hierarchy Process," *Software Quality Journal*, (2005), vol. 13, pp. 357-375.

Wolfslehner, Bernhard, Vacik, Harald, Lexer, Manfred; "Application of the analytic network process in multi-criteria analysis of sustainable forest management", Forest Ecology and Management, Mar. 2005, pp. 157-170.

Notification of Transmittal of the International Search Report and the Written Opinion of the International Searching Authority mailed Aug. 25, 2008 in corresponding PCT application No. PCT/US2007/022184 in connection with related U.S. Appl. No. 11/586,557.

Notification of Transmittal of the International Preliminary Report on Patentability mailed May 7, 2009 in corresponding PCT application No. PCT/US2007/022184 in connection with related U.S. Appl. No. 11/586,557.

Office Action issued by the U.S. Patent Office on Aug. 5, 2008 in connection with related U.S. Appl. No. 11/586,557.

Office Action issued by the U.S. Patent Office on Apr. 14, 2009 in connection with related U.S. Appl. No. 11/586,557.

Office Action issued by the U.S. Patent Office on Apr. 13, 2009 in connection with related U.S. Appl. No. 11/783,436.

Office Action issued by the U.S. Patent Office on Oct. 21, 2009 in connection with related U.S. Appl. No. 11/783,436.

Office Action issued by the U.S. Patent Office on Mar. 15, 2012 in connection with parent U.S. Appl. No. 12/646,099.

Notice of Allowance issued by the U.S. Patent Office on Apr. 17, 2012 in connection with parent U.S. Appl. No. 12/646,099.

Demirtas et al., "An integrated multiobjective decision making process for supplier selection and order allocation", Department of Industrial Engineering, Osmangazi University, 26030 Eskisehir, Turkey, Available online Feb. 28, 2006.

Tuzkaya et al., "An analytic network process approach for locating undesirable facilities: An example from Istanbul, Turkey", Department of Industrial Engineering, Yildiz Technical University, Barbaros Street, Yildiz, Istanbul 34349, Turkey, Available online Jun. 28, 2007.

Adams et al., "Super Decisions Software Guide", Copyright c 1999/2003 Thomas L. Saaty (The software for the Analytic Network Process for decision making with dependence and feedback was developed by William Adams in 1999-2003).

Neaupane et al., "Analytic network process model for landslide hazard zonation", Civil Engineering Program, Sirindhorn Int. Ins. of Technology, Thammasat University, Thailand, Available online May 2, 2008.

T.L. Saaty, "Rank from comparisons and from ratings in the analytic hierarchy/network processes", Katz Graduate School of Business, University of Pittsburgh, 322 Mervis Hall, Pittsburgh, PA 15260, USA, Available online Jun. 25, 2004.

R.W. Saaty, "Validation Examples for the Analytic Hierarchy Process and Analytic Network Process", MCDM 2004, Whistler, B. C. Canada Aug. 6-11, 2004.

Saaty, Thomas L., "The Analytic Hierarchy and Analytic Network Measurement Processes: Applications to Decisions under Risk", University of Pittsburgh, Pittsburgh, PA 15260, USA.

Office Action issued by the U.S. Patent Office on May 29, 2012 in connection with related U.S. Appl. No. 12/646,418.

Office Action issued by the U.S. Patent Office on Jul. 18, 2012 in connection with related U.S. Appl. No. 12/508,703.

Notice of Allowance issued by the U.S. Patent Office on Aug. 1, 2012 in connection with related U.S. Appl. No. 12/646,418.

Office Action issued by the U.S. Patent Office on Aug. 6, 2012 in connection with related U.S. Appl. No. 12/646,289.

Office Action issued by the U.S. Patent Office on Aug. 10, 2012 in connection with related U.S. Appl. No. 12/646,312.

Notice of Allowance issued by the U.S Patent Office on Aug. 31, 2012 in connection with related U.S. Appl. No. 12/508,703.

Office Action issued by the U.S. Patent Office on Nov. 6, 2012 in connection with related U.S. Appl. No. 13/015,754.

\* cited by examiner

MEASURING SENSITIVITY OF A FACTOR IN A DECISION

CROSS-REFERENCE TO RELATED APPLICATION

This application is a continuation of U.S. patent application Ser. No. 12/646,289 filed Dec. 23, 2009, which is herein incorporated by reference in its entirety.

TECHNICAL FIELD

The present invention relates in general to measuring, and more specifically to measuring sensitivity of factors in a decision.

BACKGROUND

The factors in a decision can be represented and quantified in an analytic hierarchy process (AHP) model. The AHP model can be used to relate the factors to overall goals, and to evaluate alternative solutions. Measuring sensitivity of factors in AHP trees is generally known. As a result of the measurements of sensitivity of nodes in the tree context, a user can see how influential individual nodes are, such as how sensitive the decision model's alternative scores are to changes in weight of various nodes in the AHP tree. Measuring sensitivity of the factors in a decision can be straightforward in the AHP tree because the AHP model uses a tree structure.

The factors in a decision also can be represented and quantified in an analytic network process (ANP) model. A process of decision making using an ANP model serves to break down large decisions into smaller, manageable decisions. When a decision is represented as a typical ANP model, nodes in the ANP model can be connected to each other without regard for hierarchy level so as to represent the interrelationship between the smaller decisions. The connections that represent the effect of smaller decisions can be synthesized to arrive at the ultimate decision. Measuring sensitivity of a factor in a decision quantified in the ANP model is consequently difficult since the ANP is not a simple tree structure and a change in one factor affects interrelated decisions and may (or may not) affect the ultimate decision.

SUMMARY

Accordingly, one or more embodiments provide an apparatus. The apparatus includes an analytic network process (ANP) storage memory that stores an ANP weighted supermatrix representing an ANP model, and a processor in communication with the ANP storage memory. The processor is configured to facilitate changing priorities of a node in the ANP weighted supermatrix to be more important, and changing priorities of the node in the ANP weighted supermatrix to be less important. The processor is also configured for assessing a sensitivity of the node which was changed relative to the ANP model. Also, the processor is configured to facilitate maintaining a same proportionality in the ANP weighted supermatrix for the changing of the priorities and the assessing of the relative sensitivity.

Another embodiment provides for the priorities of the node being changed to be more important by increasing the priorities toward 1, and scaling entries in other columns that do not include the node.

Still another embodiment provides for the priorities of the node being changed to be less important by decreasing the priorities toward 0, scaling a row corresponding to the node, and renormalizing the columns.

Yet another embodiment provides for the changing to be less important comprising, when $0 \leq p \leq p_0$, defining $F_{W,r,p_0}(p)$ by scaling the $r^{th}$ row by $$\frac{p}{p_0},$$

and renormalizing the columns; the changing to be more important comprising, when $p_0 \leq p \leq 1$, defining $F_{W,r,p_0}(p)$ by leaving alone columns of W for which $W_{r,i}=0$ and scaling all entries in the other columns, except for the entry in the $r^{th}$ row, by $$\frac{1-p}{1-p_0};$$

where
the ANP model is fixed,
W is a weighted supermatrix of the ANP model whose dimensions are n×n,
r is an integer fixed between 1 and n,
the $r^{th}$ row is the row corresponding to the node,
$0 < p_0 < 1$,
$F_{W,r,p_0}:[0; 1] \to M_{n,n}([0, 1])$ is a family of perturbations of W in the $r^{th}$ row, and
trivial columns are left unchanged throughout the family of row perturbations of the ANP model.

According to another embodiment, the changing includes, for all $0 \leq p \leq 1$, defining $F_{W,r,p_0}(p)$ by changing the $r^{th}$ row and then rescaling the remaining entries in the columns so that the columns continue to add to one. Also, according to another embodiment, the rescaling to be less important includes, for $0 \leq p \leq p_0$, changing the $r^{th}$ row by scaling it by $$\frac{p}{p_0}.$$

Also, according to another embodiment, rescaling to be more important includes, for $p_0 \leq p \leq 1$, changing the entries in the $r^{th}$ row consistent with the following formula $$F_{W,r,p_0}(p)_{r,j}=1-\alpha(1-W_{r,j})$$

where $$\alpha = \frac{1-p}{1-p_0};$$

where
the ANP model is fixed,
W is a weighted supermatrix of the ANP model whose dimensions are n×n,
r is a row and is an integer fixed between 1 and n,
$0 < p_0 < 1$,
$F_{W,r,p_0}:[0, 1] \to M_{n,n}([0, 1])$ is a family of perturbations of W in the $r^{th}$ row, and
trivial columns are left unchanged throughout the family of row perturbations of the ANP model.

Yet another embodiment also includes an output unit in communication with the processor and configured to output, for a display to a user, the relative sensitivity of the node which was changed.

A still further embodiment includes an input unit configured to input, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

Another embodiment can be a method of performing any or all of the above. Still another embodiment can be a computer readable storage medium comprising instructions for the described method.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

Figure 1:
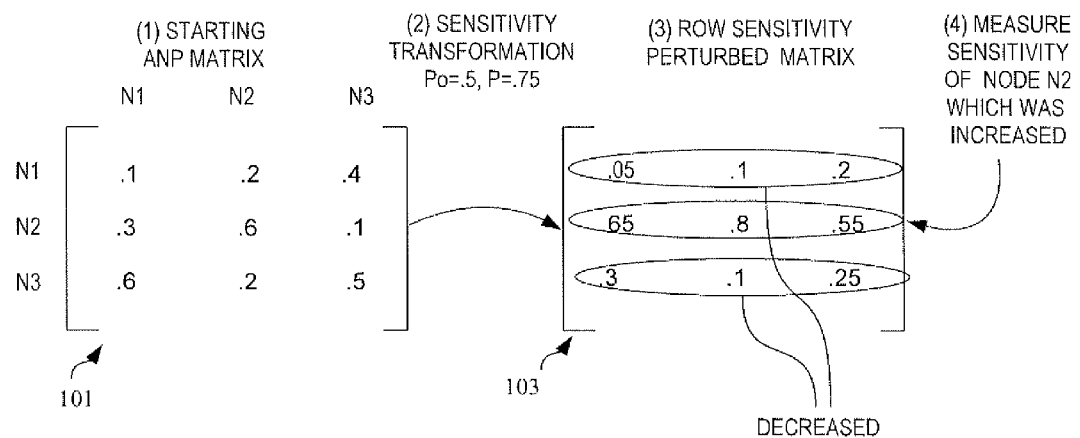
FIG. 1 is a diagram illustrating a measurement of sensitivity of a node in an ANP weighted supermatrix.

In overview, the present disclosure concerns computers, computer networks and computer systems, such as an intranet, local area network, distributed network, or the like having a capability of measuring properties of decision models. Such computer networks and computer systems may further provide services such as interacting with users, and/or evaluating modifications to a decision model. More particularly, various inventive concepts and principles are embodied in systems, devices, and methods therein related to measuring properties of an analytic network process model. It should be noted that the term device may be used interchangeably herein with computer, wireless communication unit, or the like. Examples of such devices include personal computers, general purpose computers, personal digital assistants, cellular handsets, and equivalents thereof.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Sensitivity analysis in ANP has several difficulties. The goal of sensitivity analysis is to discover how changes in the numerical information in an ANP model affect the scores for the model's alternatives. The numerical data involved could be information directly supplied to the model, such as pairwise data. On the other hand we could also want to analyze sensitivity to calculated data, such as local priorities, or global priorities. These methods do indeed show us certain levels of sensitivity. However, for the vast majority of single level ANP models, they either report useless information (tweaking global priorities is only useful in multi-level models at best), or no sensitivity (a single pairwise comparison has no effect in a well connected ANP model, likewise a single local priority has no effect in a well connected ANP model). These do little better for multi-level models.

The problem is how to perform acceptable AHP tree-type sensitivity measurements in the ANP network setting. We want to be able to have an analysis that will come up with a result which is similar to AHP tree sensitivity but in an ANP context. We want to be able to analyze the ANP network to see how influential the nodes are or how sensitive our results are to the nodes. There are pre-existing methods and systems for performing sensitivity analysis in an ANP. These ideas, however, are still lacking The systems and methods herein concern a new type of sensitivity analysis that gives rise to useful sensitivity in ANP modes, even single level ANP models, where other methods have failed. We will use the terminology "row sensitivity" for this new kind of analysis. We will show that, if we accept certain axioms about preserving ANP structure, row sensitivity as outlined here, is a kind of calculation we can perform.

It appears that any other analysis will disrupt the basic structure of the model, rendering the results less meaningful. We feel obliged to note that, although we speak throughout here of single level ANP models, row sensitivity is equally useful in multiple level ANP models. In fact, it serves, in many respects, as a superior replacement to global priorities sensitivity analysis, in that the former can preserve the overall structure of the model in a way that the latter cannot.

1.1 Sensitivity in AHP Trees

By way of introduction, let us review the basic idea and result of standard sensitivity analysis in the case of AHP trees. Although the AHP tree case does not show us the way to proceed, it does show us the kind of information we would like to glean from sensitivity.

In typical AHP tree sensitivity, we take the local weights for the collection of criteria under a common parent, and drag up or down a particular criteria's weight. Since we are dealing with a tree, a criteria's local weight and global weight are essentially the same (a simple rescaling is the only change that happens to go from local to global). By changing said local weight (or weights) we get new local priorities for the criteria in question, and re-synthesize to get new scores for our alternatives. By dragging a single criteria's priority towards one or towards zero, we get an idea of the influence that criteria has on our alternatives.

Notice, in the process of doing AHP tree sensitivity we may only choose the criteria we wish to analyze, and we are then able to see the impact of that criteria on the alternatives. We would like to be able to do a similar analysis in the ANP case.

Consider, for example, that conventional AHP tree sensitivity can be applied to ANP, which is what is done in SuperDecisions. This is sometimes referred to as local priority sensitivity. However, there are additional connections in an ANP. You can talk about how important a node is with respect to another node. This works well for AHP trees because every node only has one parent, so that the connection is to the parent. In ANP, in contrast, there can be multiple connections (or parents) to one given node (a "fixed" node). In ANP, you can inquire how important a node is "with respect to" another node, since the connections in ANP are not automatically parent-child direction connections. Furthermore, the mathematics shows that no one node is "important" in an ANP network since one little change in one connection gets overwhelmed by all of the other data, due to all of the many connections.

Figure 8:
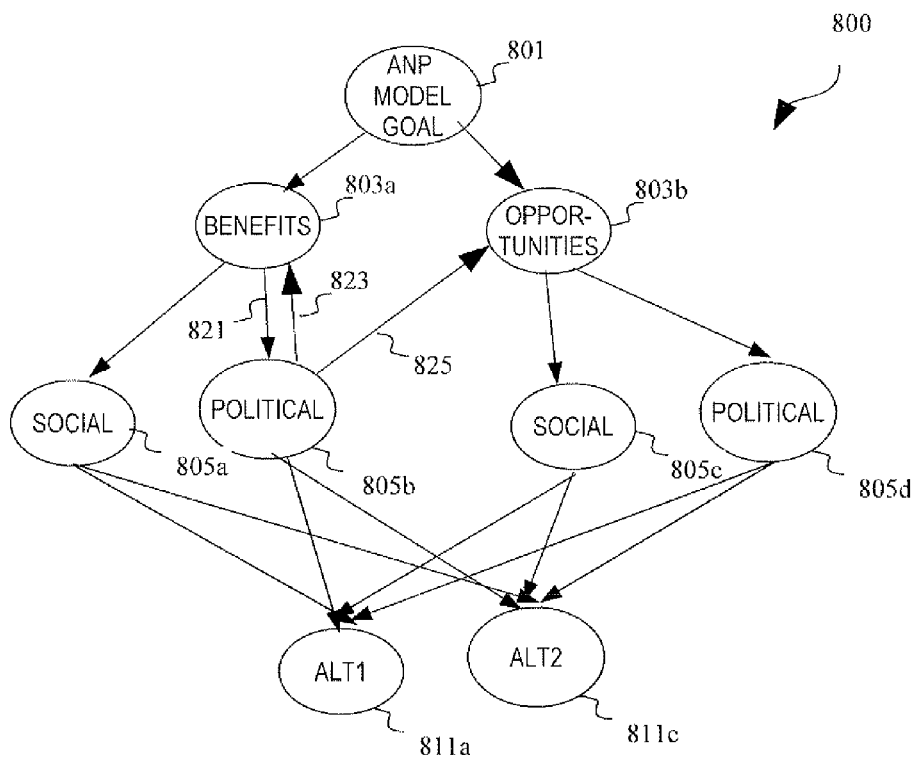
FIG. 8 is a diagram illustrating a simplified representation of an ANP model.

FIG. 8, discussed in more detail below, has a simplified representation of an ANP model which illustrates some additional connections in the ANP. A conventional structure in the ANP model is readily available from SuperDecisions.

In another conventional idea, discussed further below, the priority of a node (in the ANP) is changed after the limit matrix is calculated. That is, the node it is looked at after the fact. However, all of the ANP structure is ignored.

The technique referred to as global sensitivity tells you how important a node is, however, it is after all of the ANP limit matrix calculations have happened, so it essentially discards a lot of ANP information. It does not accurately tell how sensitive things are.

Sensitivity analysis, as it is conventionally used, is a very qualitative field. A user does not know what the quantitative difference is after making the change to a node. In practice, a user does a sensitivity analysis with the bar chart (as enabled by Decision Lens) to see how important the nodes are, such as by dragging a node all the way out to see that it has no influence.

1.2 Prior Existing ANP Sensitivity Ideas

We have already briefly mentioned most of the prior existing ANP sensitivity ideas. However we would like to collect them together here, and explain why we consider them to be insufficient analogues of AHP tree sensitivity.

Pairwise Comparison Sensitivity.

In this known analysis, a particular entry in a pairwise comparison matrix (and its reciprocal on the other side of the matrix) is changed, new local priorities are calculated, and the alternatives are re-synthesized accordingly. In order to do this a "with respect to" node is chosen, and two other nodes are chosen. Simply by virtue of all of these choices, this is not a sufficient analogue of AHP tree sensitivity. In addition, nothing useful is found in such analysis, since one pairwise comparison essentially never has an impact (except in a few degenerate cases).

Local Priority Sensitivity.

This known sensitivity technique amounts to changing a single entry in the unscaled supermatrix, recalculating the limit matrix, and re-synthesizing to arrive at alternative scores. In order to do this analysis we choose a "with respect to" node (the column of the supermatrix) as well as the row (the node whose priority we are changing). This method has two shortcomings. First we are not analyzing the sensitivity of a single node but rather of the node with respect to another node. Secondly, in nearly all cases, there is simply no sensitivity to witness (much as in the case of pairwise comparison sensitivity).

Global Priority Sensitivity.

In this known analysis, we tweak the global priority of a node (that is, after the limit matrix calculation has already occurred). This analysis proceeds by calculating the limit matrix, deriving global priorities from that limit matrix, then tweaking a node's global priority (and rescaling the others), and then re-synthesizing. This is problematic in several ways. First, if the model is a single level all calculations are done at the limit matrix level, and we are tweaking after that point so nothing useful has occurred. Second, even if the model is multiple level, by tweaking the global priority of a node after the limit matrix calculation our sensitivity analysis lies outside of much of the ANP theory, and thus feels somewhat foreign. It does have the advantage of showing the sensitivity of the model to a particular node, but at the cost of only working for multiple level models, and working outside of the context of the majority of ANP theory.

1.3 Proposed Solution

The present system is different, for reasons including that it can assign a value measuring how influential a node is. Consequently, one can identify the most influential node (or nodes). This metric might drive a user to reevaluate, e.g., their priorities (or pairwise comparisons) for that most influential node since priorities for that node makes a big difference to the ANP; or to spend more time evaluating the priorities of the more influential nodes. Alternatively, it might turn out that a small portion of nodes are most influential, and those nodes might be more heavily evaluated.

Consider that the ANP network models a decision, such as, a football team, a budget, a decision to buy a car, or other decisions which are usually complex and take into account various factors. The user can find out where in the analysis to focus their time by measuring sensitivity of different factors. For example, when the ANP network models a football team decision, the system and process helps the user decide whether to spend more time evaluating priorities with respect to the quarterback or the kicker? With a car, a user can determine whether to spend more time analyzing safety or price? As a post analysis step, a user can determine that, for example, of 30 nodes, only three are influential to the decision. By knowing that, the user can determine that, e.g., tolerance to risk affects the decision more than any other factor. In the past, one problem with conventional ANP is that where the numbers are coming from is a hidden process; this process and system can allow greater transparency to see where things are influencing the decision.

The problem we have is to get an ANP analogue of AHP tree sensitivity that yields similar results. The proposed solution can be summarized as taking the global priorities approach but moving it before the limit matrix calculation. Or, if one prefers, it can be summarized as simultaneously performing local sensitivity analysis on every column.

We want to obtain tree-sensitivity kinds of results from AHP into the ANP model context, with the same kind of usefulness. Further in accordance with exemplary embodiments, there is provided a system and processing in an ANP structure to get the same sorts of results.

Practical examples of the use of the sensitivity results include: Users can see sensitivity, for example, when they do marginal analysis or other influence analysis techniques, which rely on row sensitivity, such as described in Applicants' applications titled "MEASURING MARGINAL INFLUENCE OF A FACTOR IN A DECISION", Ser. No. 12/646,418; "MEASURING PERSPECTIVE OF A FACTOR IN A DECISION", Ser. No. 12/646,099; and/or "MEASURING CHANGE DISTANCE OF A FACTOR IN A DECISION", Ser No. 12/646,312; all filed concurrently herewith and all expressly incorporated herein by reference. For example, the end user can use this in the same way they use sensitivity in every AHP program. For example, the user might see ANP sensitivity in bar charts that reflect the importance of each node in the network. Dragging a node's bar out corresponds to doing row sensitivity analysis on the row corresponding to that node. It gives a new set of values for the alternative scores. As the bar is dragged, it gives a new set of alternative scores. This system can provide a more correct result for the users when used with an ANP.

As further discussed herein below, various inventive principles and combinations thereof are advantageously employed to provide improved row sensitivity in an ANP network. The basic idea is to change every entry in the scaled supermatrix (and then rescale the rest).

The difficulty we face is determining how much to change each entry in the given row of the supermatrix by. In order to keep the analogy with AHP tree sensitivity, we would like to have a single parameter p that we vary between 0 and 1 (corresponding to the local weight in AHP tree sensitivity). By changing that single parameter we would be changing all of the entries in the given row of the scaled supermatrix (again we could do the same in the unscaled supermatrix, the difference in results is that one tells us how sensitive we are to the node globally as opposed to how sensitive we are to the node when viewed as a part of its parent cluster).

The question becomes, for each value of the parameter p, what should we change the entries in the given row of the scaled supermatrix to? There are many choices possible, however we will see that up to continuous change of the parameter there is only one choice which will preserve the "ANP structure" of the model. (This fuzzy terminology will be made precise in the coming pages. The basic idea of preserving "ANP structure" is that we do not change the node connections, and we leave ratios of local priorities as unchanged as possible.)

2 Supermatrix Row Perturbations which Preserve ANP Structure

The idea behind row sensitivity is to perturb (that is, change by a predetermined amount) each entry in a given row of the scaled supermatrix. In order to stay stochastic, when we perturb a single entry in the supermatrix we correspondingly change the rest of the entries in that column, so that the column still adds up to one. However, the "main change" in a column is to the entry in the given row, and the changes to the rest of the column could be seen as consequences of that original entry that is changed. Since we will be changing each entry in a row, we will be changing the rest of the entries so that the columns still add to one (by simply rescaling the rest of the entries in that matrix). In order to precisely describe what preserving ANP structure means, we use a bit of notation.

2.1 Notation and Definitions

We will use W for the weighted supermatrix, $W_{i,j}$ for the entry in the $i^{th}$ row $j^{th}$ column of the weighted supermatrix. We have already mentioned that we want to use a single parameter p between 0 and 1 to describe the perturbation of our supermatrix. Let us define precisely what we mean now.

Definition 1 (Entry perturbation). Let W be the weighted supermatrix of an ANP model. We say W' is a perturbation of W in row i column j if:
  W' is stochastic of the same dimensions as W
  The columns of W' agree with the columns of W except for possibly the $j^{th}$ column.
  The ratios of the entries in the $j^{th}$ column of W' are the same as those of W except possibly the ratios involving the $i^{th}$ row.

Note 1. The above definition essentially says we have changed the entry in row i column j, and rescaled the remainder of the column so that the column still adds to one.

Definition 2 (Matrix space). Let $M_{r,k}(X)$ be the space of matrices with r rows, k columns, and entries in the space X.

Definition 3 (Row perturbation). Fix an ANP model (a single level of it) and let W be its weighted supermatrix (whose dimensions are n×n). A family of perturbations of W in the $r^{th}$ row is a continuous function f: $[0, 1] \to M_{n,n}([0, 1])$ with the following properties.
  1. f(p) is a stochastic matrix.
  2. For some $0 < p_0 < 1$ we have $f(p_0) = W$. This $p_0$ is called the fixed point of the family.
  3. f(p) is the result of a sequence of perturbations of W in row r column j as j ranges from 1 to n.

When the family of perturbations is clear, we will write W(p) for f(p), abusing notation in order to gain readability.

Definition 4 (Trivial Column). Fix an ANP model (a single level of it) and let W be its weighted supermatrix (whose dimensions are n×n). Also fix a row 1≤r≤n to consider a family of row perturbations on. A column j of W is called a trivial column for row perturbations on row r (or simply a trivial column) if either the column is zero, or the column has all zero entries except the $r^{th}$ entry is 1. A column is call non-trivial if it is not trivial.

2.2 Basic properties desired

There are two basic properties we would like a family of perturbations of the $r^{th}$ row of the weighted supermatrix to have. They deal with the end points of the family as well as the general flow of the family. We will describe the properties as well as the reason for wanting those properties now.

Let's consider W(0). In considering the AHP tree analogy, the parameter p corresponds to the local weight of our node/criteria. So W(0) can reflect what happens when the $r^{th}$ node is completely unimportant. In other words it can set all of the local weights for the $r^{th}$ criteria to zero, i.e. make the $r^{th}$ row of the supermatrix zero. The only question is what we can do with columns that have the $r^{th}$ row's entry as a 1 (and thus the rest in that column are zero).

Trivial columns are unchanged for $0<p\leq 1$ by construction. If trivial columns were to change at $p=0$ we would lose continuity at $p=0$. Thus, in order to preserve continuity we will keep trivial columns unchanged even when $p=0$. Next let's consider $W(1)$. Again considering the AHP tree analogy, the parameter p being set to one places all importance on the node/criteria in question, and zeros out the rest. So the matrix $W(1)$ can have the $r^{th}$ row with 1's in any column that had non-zero entries in W (the columns that had the $r^{th}$ row with a zero means there was no connection there, so we should not change those values), and the rest remain zero.

Lastly in the AHP tree case, as the parameter increases the local priority (and hence global priority) increases. Because of the nature of feedback within an ANP model we cannot guarantee this global priority behavior. However we would like to have, as p increases the local priorities for the $r^{th}$ criteria to increase (i.e. the values in that row of the weighted supermatrix). In other words the coordinate functions for the $r^{th}$ row of the family of matrices $W(p)$ are increasing functions.

2.3 Maintaining Proportionality

We reach a consideration about how a family of perturbations of the weighted supermatrix in a given row should behave. There are, of course, many ways we could perturb the values in a given row, based on the information of a single parameter (we could, for instance set all of the entries in that row to that parameter value). However not many of these choices would preserve the overall ANP structure, and this is what we consider now.

The idea is to maintain proportionality of elements in the supermatrix throughout our family as much as possible. We cannot keep all of the proportions identical since that would mean the matrix would never change (since the matrix needs to remain stochastic). In fact motivation comes from looking at the row we are perturbing and our axioms that $W(0)$ can zero out that row and $W(1)$ can place all importance on that row.

If we want to mimic AHP sensitivity, $W(0)$ zeros out that row. By continuity this means that as $p\to 0$ $W(p)$ should go to $W(0)$. Thus, however we change that row we can make sure that as $p\to 0$ that row goes to zero. If we force ourselves to maintain proportionality in that row no matter what value p has (at least for p close to zero) we can achieve the desired result. For instance think of p as a scaling factor to multiply the row by. Then as $p\to 0$ that row does go to zero, and maintains proportionality. So it seems we can hope to have proportionality maintained in the row in question for small values of p.

However, considering $W(1)$ shows this is not possible for values of p close to 1. For, if we maintain proportionality in that row, that row cannot go to 1 (in fact the best it could do is have one entry go to one, and the rest would maintain their proportionality to that one). Since it is not possible to maintain proportionality in that row and have that row go to one, we can look elsewhere for a position to maintain proportionality in. If we force the other rows to maintain their proportionality when p is close to 1, it turns out to maintain the proportionality of the distance from 1 of the entries in our row (which is a useful proportionality to maintain).

Thus the proportionality we expect to maintain depends on the values of our parameter p. Although no formal proof has been yet given that these proportionalities are possible we hope to have shown at least why we cannot have proportionality in the row in question as p goes to 1.

2.4 Formal Definition

We will now collect the various ideas presented above into a single definition for the kind of object we wish to study and use to extend the concept of AHP tree sensitivity to the ANP world.

Definition 5 (Family of row perturbations preserving ANP structure). Fix an ANP model (a single level of it) and let W be its weighted supermatrix (whose dimensions are n×n). A family of perturbations of W in the $r^{th}$ row $f:[0, 1]\to M_{n,n}([0, 1])$ is defined as preserving the ANP structure if the following 1-5 are true:

1. Trivial columns (if present) remain unchanged throughout the family. In other words if the $j^{th}$ column of W is trivial then the $j^{th}$ column of $f(p)$ equals the $j^{th}$ column of W for all $0\leq p\leq 1$.

2. If $W_{r,i}$ is zero then the $i^{th}$ column of $f(p)=W(p)$ equals the $i^{th}$ column of W for all p (that is, if there is no connection from i to r we will not create one ever in the family).

3. If $W_{r,i}$ is non-zero and the $i^{th}$ column of W is non-trivial, then $W(p)_{r,i}$ is not zero except for $p=0$ (that is the connection from i to r is not broken except when $p=0$ and all influence is removed from node r).

4. If $p_0$ is the parameter for which $W(p_0)=W$ then for $p<p_0$ $W(p)$'s $r^{th}$ has the same proportionality as W's $r^{th}$ row. That is, for $p<p_0$ we have $W_{r,i}$ $$\frac{W_{r,i}}{W_{r,j}} = \frac{W(p)_{r,i}}{W(p)_{r,j}}$$

where these fractions are defined.

5. For $p>p_0$ we have for all i, i'≠r:

$$\frac{W_{i,j}}{W_{i',j'}} = \frac{W(p)_{i,j}}{W(p)_{i',j'}}$$

where these fractions are defined. That is, maintain proportionality of all of the rows except for the $r^{th}$ row.

6. We say that the family is increasing if $W(p)_{r,i}$ is an increasing function if $W_{r,i}$ is not zero, and is the constant function zero if $W_{r,i}=0$.

With this we have a definition of a family of row perturbations that preserve ANP structure, and good reasons to accept this as useful definition. However we do not yet know if such families exist.

2.5 Existence

In fact such families do exist, as we shall now prove. First we define our proposed family, and then prove it preserves the ANP structure.

Definition 6. Fix an ANP model (a single level of it) and let W be its weighted supermatrix (whose dimensions are n×n), and fix r an integer between 1 and n. Pick $0<p_0<1$, and define $F_{W,r,p_0}:[0; 1]\to M_{n,n}([0, 1])$ in the following fashion. Firstly leave trivial columns unchanged throughout the family. Next, if $0\leq p\leq p_0$ define $F_{W,r,p_0}(p)$ by scaling the $r^{th}$ row by $$\frac{p}{p_0},$$

and renormalizing the columns. Since we have changed the entry in the $r^{th}$ row and do not want to change the entry in the $r^{th}$ row again by renormalizing, we instead scale the rest of the entries in that column to renormalize the columns. If $p_0\leq p\leq 1$ define $F_{W,r,p_0}(p)$ by leaving alone columns of W for which $W_{r,i}=0$ and scaling all entries in the other columns, except for the entry in the $r^{th}$ row, by $$\frac{1-p}{1-p_0}$$

and change the $r^{th}$ entry to keep the matrix stochastic.

Note 2. There is a subtlety, in that we have defined the above function in two ways for $p=p_0$. However using either formula we get the result of W when we plug in $p=p_0$ so that the above function is well defined.

Note 3. The above function is a piecewise defined function whose pieces are linear, and they agree at the intersection of the two regions of definition. Thus the above function is continuous.

Theorem 1. Fix an ANP model (a single level of it) and let W be its weighted supermatrix (whose dimensions are n×n), fix r an integer between 1 and n, and pick $0<p_0<1$. Then $F_{W,r,p_0}(p)$ is a family of row perturbations preserving the ANP structure.

Proof. It is clear that $F_{W,r,p_0}(p)$ satisfies the three conditions for being a family of row perturbations, thus we can proceed to demonstrating that it preserves the ANP structure. However the preservation of ANP structure simply follows from the definitions. In addition it is clear that $F_{W,r,p_0}(p)$ (p) is increasing as well.

2.6 Uniqueness

Thus we have a family of row perturbations which preserves the ANP structure, which is useful. However, what is surprising is that this family is essentially the only family preserving the ANP structure, up to change of parameter. Let us make this precise.

Theorem 2 (Uniqueness). Fix an ANP model (a single level of it) and let W be its weighted supermatrix (whose dimensions are n×n), fix r an integer between 1 and n, and pick $0<p_0<1$. Let f(p) be a family of row perturbations preserving the ANP structure with $p_0$ as the fixed point. Then there exists a continuous map $h:[0, 1] \to [0, 1]$ so that $$f = F_{W,r,p_0} \cdot h$$

Proof. We will define h(p) piecewise, first for $0 \le p \le p_0$ and then $p_0 \le p \le 1$. Let $0 \le p \le p_0$. Then f(p) preserves ratios in the $r^{th}$ row, i.e. the $r^{th}$ row is a scalar multiple of the $r^{th}$ row of W, let j be a column for which $W_{r,j} \ne 0$. We can calculate that scalar as $$\frac{f(p)_{r,j}}{W_{r,j}}$$

and thus we define $$h(p) = p_0 \cdot \frac{f(p)_{r,j}}{W_{r,j}}.$$

Since f is continuous its (r, j) entry function is continuous and thus h is continuous. Notice that $h(p_0)=p_0$, and that we can determine $F_{W,r,p_0} \cdot h(p)_{r,j}$ using the following sequence of equalities.

$$F_{W,r,p_0} \circ h(p)_{r,j} = F_{W,r,p_0}(h(p))_{r,j}$$

$$= F_{W,r,p_0}\left(p_0 \cdot \frac{f(p)_{r,j}}{W_{r,j}}\right)$$

$$= W_{r,j} \cdot \left(p_0 \cdot \frac{f(p)_{r,j}}{W_{r,j}}\right) \cdot \frac{1}{p_0}$$

$$= f(p)_{r,j}$$

Since f and $F_{W,r,p_0}$ preserve the ANP structure and agree in the (r, j) entry, they agree in all entries. Thus for $0 \le p \le p_0$ $$f(p) = F_{W,r,p_0} \cdot h(p)$$

Next for $p_0 \le p \le 1$ we note that f(p) preserves the ratios of the rows other than r, since f preserves the ANP structure. Let $W_{i,j}$ be a non-zero entry with $i \ne r$. Since f preserves the ratios of rows other than the $r^{th}$ row, we have a simple scalar multiplication of those rows. We can calculate that scalar as $$\frac{f(p)_{i,j}}{W_{i,j}}$$

and we define h(p) for $p_0 \le p \le 1$ as $$h(p) = 1 - \frac{f(p)_{i,j}}{W_{i,j}}(1-p_0).$$

Notice that h(p) as defined above is continuous since f's entries are continuous and that $h(p_0)=p_0$ (thus both definitions agree at their overlap of $p_0$, so there is no ambiguity in our definition). Furthermore we can see the following equalities.

$$F_{W,r,p_0} \circ h(p)_{i,j} = F_{W,r,p_0}(h(p))_{i,j}$$

$$= \frac{1-h(p)}{1-p_0} W_{i,j}$$

$$= \frac{1 - \left(1 - \frac{f(p)_{i,j}}{W_{i,j}}(1-p_0)\right)}{1-p_0} W_{i,j}$$

$$= \frac{\frac{f(p)_{i,j}}{W_{i,j}}(1-p_0)}{1-p_0} W_{i,j}$$

$$= f(p)_{i,j}$$

Since f and $F_{W,r,p_0}$ preserve the ANP structure and agree in the (i,j) entry, they agree in all entries. Thus for $p_0 \le p \le 1$ $$f(p) = F_{W,r,p_0} \cdot h(p)$$

Thus we have demonstrated $h:[0, 1] \to [0, 1]$ which is continuous (since the piecewise parts are continuous and they agree on the overlap) which satisfies $$f(p) = F_{W,r,p_0} \cdot h(p)$$

for all $0 \le p \le 1$.

Remark 1. The previous theorem states that there is only one way to do row sensitivity in way that preserves the ANP structure (up to change of parameter).

3 Example Calculations

So that we may see how these results play out, let us consider a few examples calculated by hand.

3.1 Two Node Model

This model contains just two nodes in a single cluster, fully connected. The weighted supermatrix (which is really just the unweighted supermatrix in this case) is $$W = \begin{bmatrix} .2 & \frac{2}{3} \\ .8 & \frac{1}{3} \end{bmatrix}$$

With this supermatrix we get the normalized priority vector for the alternatives (which we denote as A)

$$A = \begin{bmatrix} 0.\overline{45} \\ 0.\overline{54} \end{bmatrix}$$

We will do row sensitivity on the second row, using parameter values of 0.1 and 0.9 (which corresponds to pushing down the priority of the second row for p=0.1 and pushing it up for p=0.9). For simplicity we will use $p_0=0.5$.

As a matter of notation we will use $A_p$ to denote the new synthesized normalized values of the alternatives when we do row sensitivity with value p, and $L_p$ for the limit matrix when the parameter is p.

p=0.1: Let us calculate $F_{W,2,0.5}(0.1)$ first (and then we will calculate the limit matrix). Using our formula we will scale row 2 by 0.1/0.5=0.2. Thus row two of our new matrix will be 0.4 and 0.2/3. Normalizing our columns we get the first row is 0.6 and 2.8/3. Thus $$F_{W,2,.5}(0.1) = \begin{bmatrix} .6 & \frac{2.8}{3} \\ .4 & \frac{.2}{3} \end{bmatrix}.$$

The limit matrix is therefore:

$$L_{0.1} = \begin{bmatrix} .7 & .7 \\ .3 & .3 \end{bmatrix}$$

which gives the new synthesized priorities of $$A_{0.1} = \begin{bmatrix} .7 \\ .3 \end{bmatrix}$$

which has substantially reduced the score of the second alternative from the original values. This is what we would expect by analogy with AHP tree sensitivity. We have decreased the importance of the second alternative prior to calculating the limit matrix, and thus its overall priority has decreased after calculating the limit matrix.

p=0.9: Again let us calculate $F_{W,2,0.5}(0.9)$ first and then proceed to the limit matrix. Using the definition we will scale the rows other than 2 (i.e. row one) by $$\frac{1-0.9}{1-0.5} = 0.2.$$

Thus the first row becomes 0.04 and 0.4/3. Renormalizing the columns yields the second row as 0.96 and 2.6/3. Thus $$F_{W,2,0.5}(0.9) = \begin{bmatrix} .04 & .4/3 \\ .96 & 2.6/3 \end{bmatrix}$$

The limit matrix is therefore:

$$L_{0.9} = \begin{bmatrix} .12195121 90402955 & .12195121 95777367 \\ .87804878 09597046 & .87804878 04222634 \end{bmatrix}$$

which gives the new synthesized priorities of $$A_{0.9} = \begin{bmatrix} .121951 \\ .878049 \end{bmatrix}$$

which has substantially increased the score of the second alternative from the original values. Again this result is as we would expect.

3.2 Four Node Model

This is a model with two clusters each of which have two nodes (thus four nodes altogether). There is a single criteria cluster, and the alternatives clusters. In the criteria cluster there are criteria A and B. In the alternatives cluster are two nodes, alt1 and alt2. Everything in the model is fully connected and the weighted supermatrix, and alternative scores are as follows (the order of the nodes being A, B, alt1, and finally alt2).

$$W = \begin{bmatrix} 0.375 & 0.20 & 0.175 & 0.10 \\ 0.125 & 0.30 & 0.325 & 0.40 \\ 0.400 & 0.05 & 0.275 & 0.15 \\ 0.100 & 0.45 & 0.225 & 0.35 \end{bmatrix}$$

$$A = \begin{bmatrix} 0.388144 \\ 0.611856 \end{bmatrix}$$

As before we will set p=0.1 first, then p=0.9, and we will work with criteria B sensitivity (i.e. row 2) and $p_0=0.5$.

p=0.1: First we calculate the new matrix. For p=0.1 we scale row 2 by 0.1/0.5=0.2, and then renormalize. We get $$F_{W,2,5}(0.1) = \begin{bmatrix} .417857 & .268571 & .242407 & .153333 \\ 0.025 & 0.06 & 0.065 & 0.08 \\ .445714 & .067143 & .380926 & .536667 \\ .111429 & .604286 & .3111667 & .349993 \end{bmatrix}$$

The limit matrix result is:

$$L_{0.1} = \begin{bmatrix} .2572 & .2572 & .2572 & .2572 \\ .0598 & .0598 & .0598 & .0598 \\ .3248 & .3248 & .3248 & .3248 \\ .3583 & .3583 & .3583 & .3583 \end{bmatrix}$$

This yields the following synthesized priorities for alt1 and alt2.

$$A_{0.1} = \begin{bmatrix} .4758 \\ .5242 \end{bmatrix}$$

p=0.9: Let us calculate the new matrix. Using our formula we will multiply rows 1, 3, and 4 by $$\frac{1-0.9}{1.0.5} = 0.2,$$

and then change row 2 to normalize the columns. This gives us the limit matrix is thus $$F_{W,2,0.5}(0.9) = \begin{bmatrix} .075 & .040 & .035 & .020 \\ .825 & .860 & .875 & .880 \\ .080 & .010 & .055 & .030 \\ .020 & .090 & .045 & .070 \end{bmatrix}$$

$$L_{0.9} = \begin{bmatrix} .039761 & .039761 & .039761 & .039761 \\ .863877 & .863877 & .863877 & .863877 \\ .015210 & .015210 & .015210 & .015210 \\ .085178 & .085178 & .085178 & .085178 \end{bmatrix}$$

and finally the synthesized priorities are $$A_{0.9} = \begin{bmatrix} .1515 \\ .8485 \end{bmatrix}$$

4 Alternate Definition of $F_{W,r,p_0}(p)$

The definition given previously for the family of row perturbations $F_{W,r,p_0}(p)$ is useful conceptually; however, there is another useful way of defining that family (a different way to write the formula) that only talks about changing the $r^{th}$ row and rescaling the rest of each column. We describe that formula in terms of the theorem below (stating that the new formulation is the same as our original formulation).

Theorem 3. Fix an ANP model (a single level of it) and let W be its weighted supermatrix (whose dimensions are n×n), and fix r an integer between 1 and n. Pick $0<p_0<1$. We can define $F_{W,r,p_0}:[0, 1] \to M_{n,n}([0, 1])$ in the following alternate fashion. First leave trivial columns unchanged throughout the family. Next, for all $0 \le p \le 1$ we define $F_{W,r,p_0}(p)$ by changing the $r^{th}$ row and then rescaling the remaining entries in the columns so that the columns continue to add to one. For $0 \le p \le p_0$ we change the $r^{th}$ by scaling it by $$\frac{p}{p_0}.$$

For $p_0 \le p \le 1$ we change the entries in the $r^{th}$ row by the following formula $$f(p) = F_{W,r,p_0}(p)_{r,j} = 1 - \alpha(1 - W_{r,j})$$

where $$\alpha = \frac{1-p}{1-p_0}.$$

Note 4. The above formulation implies that, for $p_0 \le p \le 1$ we scale the distance from 1 of the entries in the $r^{th}$ row by $$\alpha = \frac{1-p}{1-p_0}.$$

Proof. Our new definition agrees with the original definition for $0 \le p \le p_0$, thus we can proceed to the other case. Thus let $p_0 \le p \le 1$. We have the formula $$f(p) = F_{W,r,p_0}(p)_{r,j} = 1 - \alpha(1 - W_{r,j})$$

Fix a non-trivial column j, we can show that $$F_{W,r,p_0}(p)_{i,j} = \frac{1-p}{1-p_0} W_{i,j} = \alpha W_{i,j}$$

for all $i \ne r$ to prove our definitions coincide.

Let $\beta_j$ be the scaling factor we scale the entries of the $j^{th}$ column by (except for the $r^{th}$ row). Then $F_{W,r,p_0}(p)_{i,j} = \beta W_{i,j}$. Since the $j^{th}$ column of $F_{W,r,p_0}(p)$ adds to one, we get the following sequence of equalities.

$$1 = \sum_{i=0}^{n} F_{W,r,p_0}(p)_{i,j}$$
$$= F_{W,r,p_0}(p)r,j + \sum_{i \ne r} F_{W,r,p_0}(p)_{i,j}$$
$$= 1 - \alpha(1 - W_{r,j}) + \sum_{i \ne r} \beta_j W_{i,j}$$
$$= 1 - \alpha(1 - W_{r,j}) + \beta_j \sum_{i \ne r} W_{i,j}$$
$$= 1 - \alpha(1 - W_{r,j}) + \beta_j(1 - W_{r,j})$$

The last equality coming from the factor that the columns of W add to one. We can continue in the following fashion.

$$1 = 1 - \alpha(1 - W_{r,j}) + \beta_j(1 - W_{r,j})$$
$$\alpha(1 - W_{r,j}) = \beta_j(1 - W_{r,j})$$
$$\alpha = \beta_j$$

Thus we are rescaling the entries of the $j^{th}$ column (except the entry in the $r^{th}$ row) by $\alpha$, which completes the proof In review, there are two different definitions of the above approaches, Section 2.5 and Section 4, which is an alternate. Section 4 can be easier to code as software, but it is equivalent to the definition of Section 2.5.

A difference between the definitions of Section 2.5 and Section 4 is in how the $r^{th}$ row is changed. For $0 \le p \le p_0$, is about perturbing downward (scaling by $p/p_0$). Perturbing downward is identical in both definitions.

In Definition 6, for perturbing downward ($0 \le p \le p_0$) the given row is rescaled; for perturbing upward ($p_0 \le p \le 1$), everything except the given row is rescaled by a particular factor. Mathematically, this is straightforward. Calculationally, it is difficult.

From a calculational perspective, it is easier work with one row. In Section 4, perturbing downwardly is the same as Section 2.5 (rescale the given row by p/p0). For perturbing upwards, we rescale the given $r^{th}$ row by the given formula in Section 4, Theorem 3. That is, whether we perturb upward or downward, we change the $r^{th}$ row, and then we rescaled the remaining rows. If perturbing downward, rescale by $p/p_0$. If perturbing upward, change the entries by the given formula in Section 4, Theorem 3 (which is rescaling to keep the distances from 1 the same). Section 2.5 performs the upward perturbation differently, as discussed above.

The reason the upward and downward perturbation approaches are different is due to end point behavior. As a node is perturbed upward, the priorities approach 1 (which adds importance on that node). As the priorities for a node are perturbed downward to approach zero, less importance is placed on that node. The same formula will not provide behavior for upward and downward. As approaching 0, the node gets less important and priorities approach 0. As importance approaches 1, all other nodes get more inconsequential.

The approach of Sections 2.5 and 4 will now be discussed in a more general sense. Referring now to FIG. 1, a diagram illustrating a measurement of sensitivity of a node in an ANP weighted supermatrix will be discussed and described. At (1) is a starting ANP weighted supermatrix 101, which has been prepared in accordance with conventional techniques resulting in the illustrated entries for each local priority. That is the value of N1 with respect to N1 is 0.1, N2 with respect to N1 is 0.3, N3 with respect to N1 is 0.6, N1 with respect to N2 is 0.2, N2 with respect to N2 is 0.6, N3 with respect to N2 is 0.2, N1 with respect to N3 is 0.4, N2 with respect to N3 is 0.1, and N3 with respect to N3 is 0.5.

At (2), the sensitivity of a node is transformed. That is, a node (sometimes referred to as a "fixed node") is selected and the priorities of the selected node are perturbed. In the illustration, the selected node, N2, corresponds to the middle row and the priorities are perturbed upward. In this example, the predetermined fixed point Po and parameter value P selected for use in the sensitivity transformation are 0.5 and 0.75, respectively.

At (3) is an ANP weighted supermatrix 103 which has sensitivity of a row corresponding to the selected node perturbed upwardly. To arrive at the row sensitivity perturbed ANP weighted supermatrix 103, the proportionality of the starting ANP weighted supermatrix 101 has been maintained despite perturbing the selected node N2, and the proportionality is substantially present in the row sensitivity perturbed ANP supermatrix 103, with the exception of the selected node which was perturbed. As summarized in this illustration, the values in the middle row (corresponding to the selected node which is perturbed) of the supermatrix are made larger, whereas the values in the other rows are made smaller.

Since $p_0$ is 0.5 and p is 0.75, p is moving half way to 1. Proportionally, then, the value at N2, N2 should move halfway to 1. The value at N2, N2 is 0.6, which is 0.4 from 1. By adding 0.2 to 0.6 (i.e., 0.8), then N2, N2 will be perturbed halfway to 1. The generation of the row sensitivity perturbed matrix continues as detailed above.

At (4) the sensitivity of the node which was perturbed is measured (also referred to as "assessed"). The assessment can include determining the sensitivity of the selected node before and after perturbation. Sensitivity is defined to be the new synthesized alternatives priority. Sensitivity is a value x, $0 < x \leq 1$. By perturbing one or more selected nodes according to a predetermined amount, the sensitivity of the selected node with respect to the ANP model can be quantified.

Figure 2:
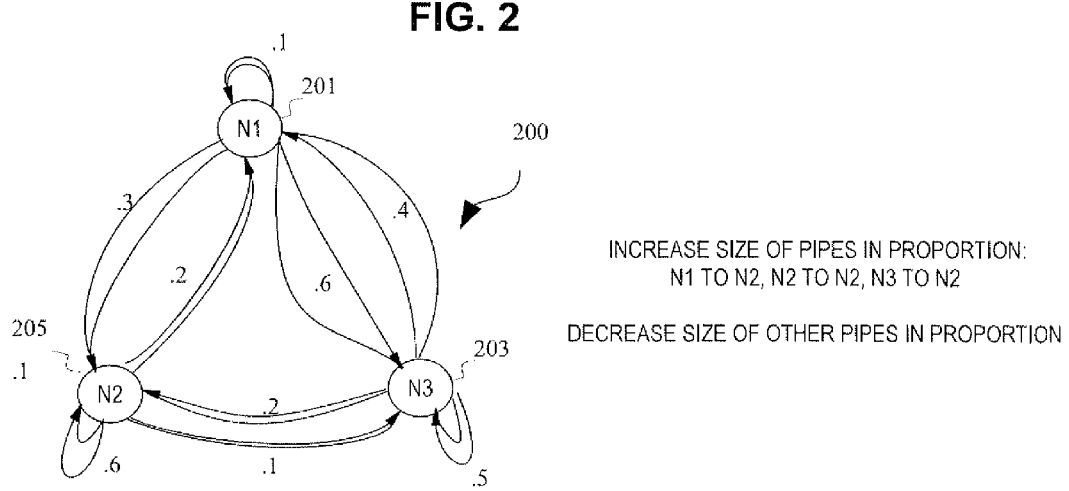
FIG. 2 is an explanatory diagram for a further explanation of FIG. 1.

Referring now to FIG. 2, an explanatory diagram for a further explanation of FIG. 1 will be discussed and described. FIG. 2 is a visualization of the relation of the three nodes N1, N2, and N3. The directional "pipes" from one node to another which reflect the importance. As in FIG. 1, here the sensitivity of node N2 is being measured and hence the size of pipes that end in node N2 will be increased, i.e., pipes from N1 to N2, N2 to N2, and N3 to N2. The sizes of the other pipes are decreased, in proportion to the increase.

Figure 3:
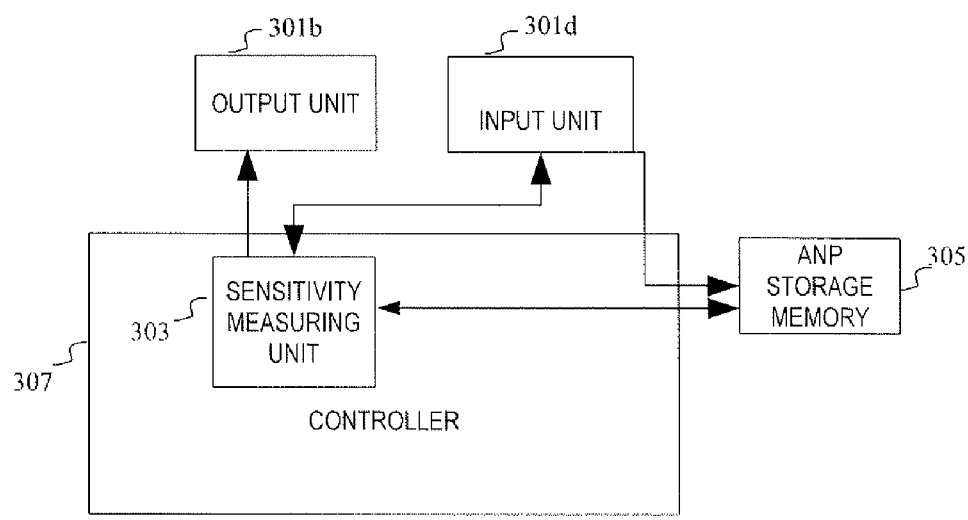
FIG. 3 is a block diagram illustrating a system for measuring sensitivity.

Referring now to FIG. 3, a block diagram illustrating a system for measuring sensitivity will be discussed and described. In the illustrated embodiment, there is provided a controller 307, with a sensitivity measuring unit 303. The sensitivity measuring unit 303 can access an ANP storage memory 305, in order to measure sensitivity of nodes in the ANP model in the ANP storage memory 305. Users can interact via an output unit 301b and/or an input unit 301d with the sensitivity measuring unit 303. Also, users can interact via an input unit 301d with the ANP model stored in the ANP storage memory 305, for example where votes for the ANP model (which can represent votes) are input via the input unit 301d. The output unit 301b and/or input unit 301d can be remote or local.

Figure 4:
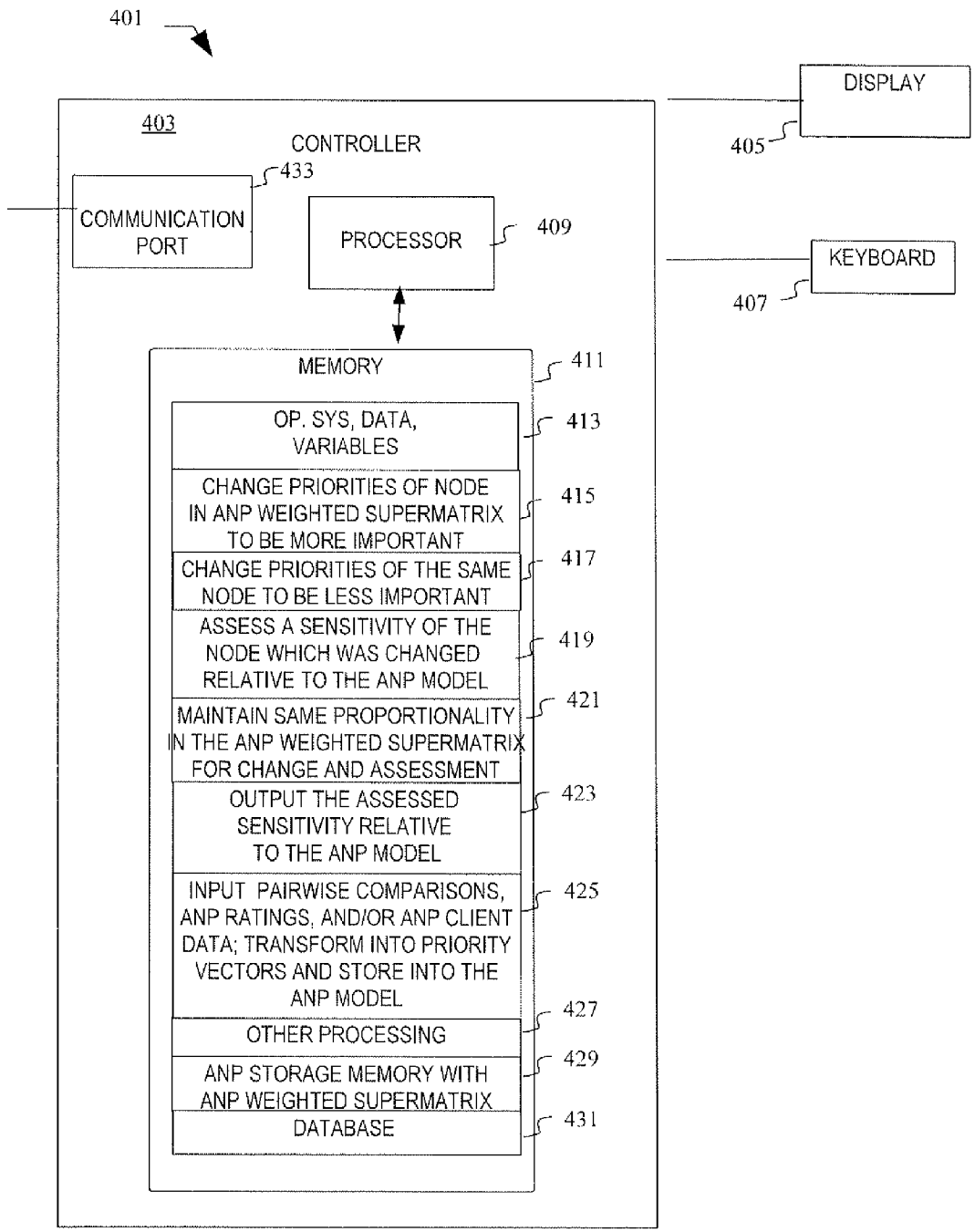
FIG. 4 is a block diagram illustrating portions of an exemplary computer.

Referring now to FIG. 4, a block diagram illustrating portions of an exemplary computer will be discussed and described. The computer 401 may include an optional communication port 433 for communication with an external device (not illustrated), a processor 409, a memory 411, a display 405, and/or a user input device 407, e.g., a keyboard (as illustrated), trackball, mouse, or known voting device. Many of the other elements of a computer are omitted but will be well understood to one of skill in the art.

The processor 409 may comprise one or more microprocessors and/or one or more digital signal processors. The memory 411 may be coupled to the processor 409 and may comprise a read-only memory (ROM), a random-access memory (RAM), a programmable ROM (PROM), and/or an electrically erasable read-only memory (EEPROM). The memory 411 may include multiple memory locations for storing, among other things, an operating system, data and variables 413 for programs executed by the processor 409; computer programs for causing the processor to operate in connection with various functions such as to change 415 priorities of a node in the ANP weighted supermatrix to be more important, to change 417 priorities of the node in the ANP weighted supermatrix to be less important, to assess 419 sensitivity of the node which was changed relative to the ANP model, to maintain 421 the same proportionality in the ANP weighted supermatrix, to output 423 the assessed sensitivity relative to the ANP model, to input 425 pairwise comparisons, ANP ratings, and/or ANP client data, and transform the data into priority vectors and store into an ANP storage memory 429, and/or other processing 427; the ANP storage memory 429 in which the ANP weighted supermatrix is stored; and a database 431 for other information used by the processor 409. The computer programs may be stored, for example, in ROM or PROM and may direct the processor 409 in controlling the operation of the computer 401.

The user may invoke functions accessible through the user input device 407. The user input device 407 may comprise one or more of various known input devices, such as a keypad, a computer mouse, a touchpad, a touch screen, a trackball, a keyboard and/or a button device configured to register votes. Responsive to signaling received from the user input device 407, in accordance with instructions stored in memory 411, or automatically upon receipt of certain information via the communication port 433, the processor 409 may direct information in storage or information received by the user input device to be processed by the instructions stored in memory 411.

The display 405 may present information to the user by way of a text and/or image display 405 upon which information may be displayed. The display 405 may present information to the user by way of an available liquid crystal display (LCD), plasma display, video projector, light emitting diode (LED) or organic LED display, cathode ray tube, or other visual display; and/or by way of a conventional audible device (such as a speaker, not illustrated) for playing out audible messages.

The processor 409 can be programmed to change 415 priorities of a node in the ANP weighted supermatrix to be more important. The processor 409 can be programmed to change 417 priorities of the node in the ANP weighted supermatrix to be less important. The processor 409 can be programmed to perform the increase of importance, or to perform the decrease of importance, or to perform both the increase and decrease of importance, as part of a single measurement of the sensitivity of a node. Examples are discussed further herein as to how to performed the change of priorities.

The processor 409 can be programmed to assess 419 sensitivity of the node which was changed relative to the ANP model. The assessment of the sensitivity of the node is discussed in more detail above and is not repeated here.

The processor 409 can be programmed to maintain 421 the same proportionality in the ANP weighted supermatrix. The same proportionality is maintained while preserving the ANP structure. The proportionality is maintained throughout the change of priorities of the node in the ANP weighted supermatrix to be less important and/or more important, as well as throughout the assessment of the sensitivity of the node which was changed relative to the ANP model.

To preserve the ANP structure, connections are not created or destroyed. That is, an entry in the matrix is not changed to or from zero, except when p=0, since a non-zero value represents a connection whereas a zero value indicates that there is no connection.

Preserving proportionality is a more difficult consideration. So, the question is, if I am making changes to this row, what is the most proportionality I can keep? Hence, maintaining proportionality is the more difficult and/or subtle problem for figuring out how this should behave.

No connections in the ANP network are created or destroyed by doing this present process. If a priority is zero, then there is no connection to another node. If that is ever changed from zero to something, then a connection has been created by the system, which is bad because the user did not create the connection. The change from zero changes the ANP structure because it creates a connection that was not there originally. Likewise, taking a non-zero value (which is a connection) and changing it to zero deletes a connection which was there. An embodiment of the present process does not create or destroy connection.

Now consider how to preserve as much of proportionality as possible, that is, preserving the ratios of the numbers involved in the ANP model as possible. If, in the original ANP model, e.g., node A is twice as good as node B, that proportionality is maintained as much as possible. It cannot be kept exactly, because that means nothing can be changed. However, by doing row sensitivity, you will break a few proportionalities. There is no choice. But, the other proportionalities you want to keep.

That is, to keep proportionality while changing a node to test that node, you are attempting to maintain proportionality for the other non-changed nodes, as well as that row as much as possible. Proportionality involves a node and a with-respect-to, and you want to preserve those proportionalities as much as possible. Section 2.3 (above) further discusses maintaining proportionality.

To measure sensitivity, a row will be changed. There is one way to change that row to keep as much proportionality throughout the ANP network as possible. Preserving ANP proportionality is discussed for example in Section 2.4, and Definition 5.

While maintaining proportionality, trivial columns are not changed. This is discussed above, for example, in Section 2.4, point 1, and "trivial columns" are defined in definition 4. That is, something that is not from, stays that way; or something that is only connected to the fixed node, stays that way.

While maintaining proportionality, connections are not created, as discussed in, e.g., Section 2.4, point 2. Also, as discussed in Section 2.4, point 3, connections are not destroyed. To summarize points 2 and 3, in order to preserve ANP structure, connections are not created or destroyed.

Preservation of proportionality is further discussed in Section 2.4, points 4 and 5. There are two cases discussed. There is the case of perturbing downward, and the case of perturbing upward. Case 4 ("perturbing downward") is decreasing the influence/importance of a node to look at its sensitivity. Case 5 is increasing the importance of a node to look at its sensitivity. Both cases are going to tell you what kind of proportionality is to be maintained.

The processor 409 can be programmed to output 423 the assessed sensitivity relative to the ANP model. That is, a representation of the measurement can be visually displayed for a user. For example, a chart can be provided showing the relative sensitivity of one or more nodes in the ANP model. The most (or least) sensitive node can be listed, nodes can be listed in order of sensitivity, and the like. By such a measurement, a user can identify the most (or least) sensitive nodes so as to further refine or interact with the ANP model with respect to those nodes.

The processor 409 can be programmed to interact with the user so as to input 425 new or modified pairwise comparisons, ANP ratings, and/or ANP client data, and transform the data into priority vectors and store into the ANP model. As with traditional ANP, alternatives can be pairwise compared. The data which is input can be transformed into priority vectors, as with traditional ANP, and matrix transformations can be prepared. The result can be stored into the ANP, such as the ANP storage memory 429 with ANP weighted supermatrix in the memory 411.

Optionally, other components may be incorporated in the computer 401 to produce other actions. For example, a user can interface with the computer 401, via a known user interface such as OUTLOOK software, WINDOWS software, and/or other commercially available interfaces. Further, the computer 401 can send and receive transmissions via known networking applications operating with the communication port 433 connected to a network, for example, a local area network, intranet, or the Internet and support software.

It should be understood that various embodiments are described herein in connection with logical groupings of programming of functions. One or more embodiments may omit one or more of these logical groupings. Likewise, in one or more embodiments, functions may be grouped differently, combined, or augmented. For example, in one or more embodiments, the synthesizer can be omitted. In addition, some of these functions may be performed predominantly or entirely on one or more remote computers (not illustrated); and therefore such functions can be reduced or omitted from the processor 409 and distributed to the remote computer. Similarly, the present description may describe various databases or collections of data and information. One or more embodiments can provide that databases or collections of data and information can be distributed, combined, or augmented, or provided locally (as illustrated) and/or remotely (not illustrated).

The ANP storage memory 429 is illustrated as being part of memory 411 stored locally on the controller 403. It will be appreciated that the ANP storage memory 429 can be stored remotely, for example, accessed via the communication port 433 or similar.

The computer 401 can include one or more of the following, not illustrated: a floppy disk drive, an optical drive, a hard disk drive, a removable USB drive, and/or a CD ROM or digital video/versatile disk, which can be internal or external. The number and type of drives can vary, as is typical with different configurations, and may be omitted. Instructions which are executed by the processor 409 and/or an ANP model can be obtained, for example, from the drive, via the communication port 433, or via the memory 411.

Figure 5:
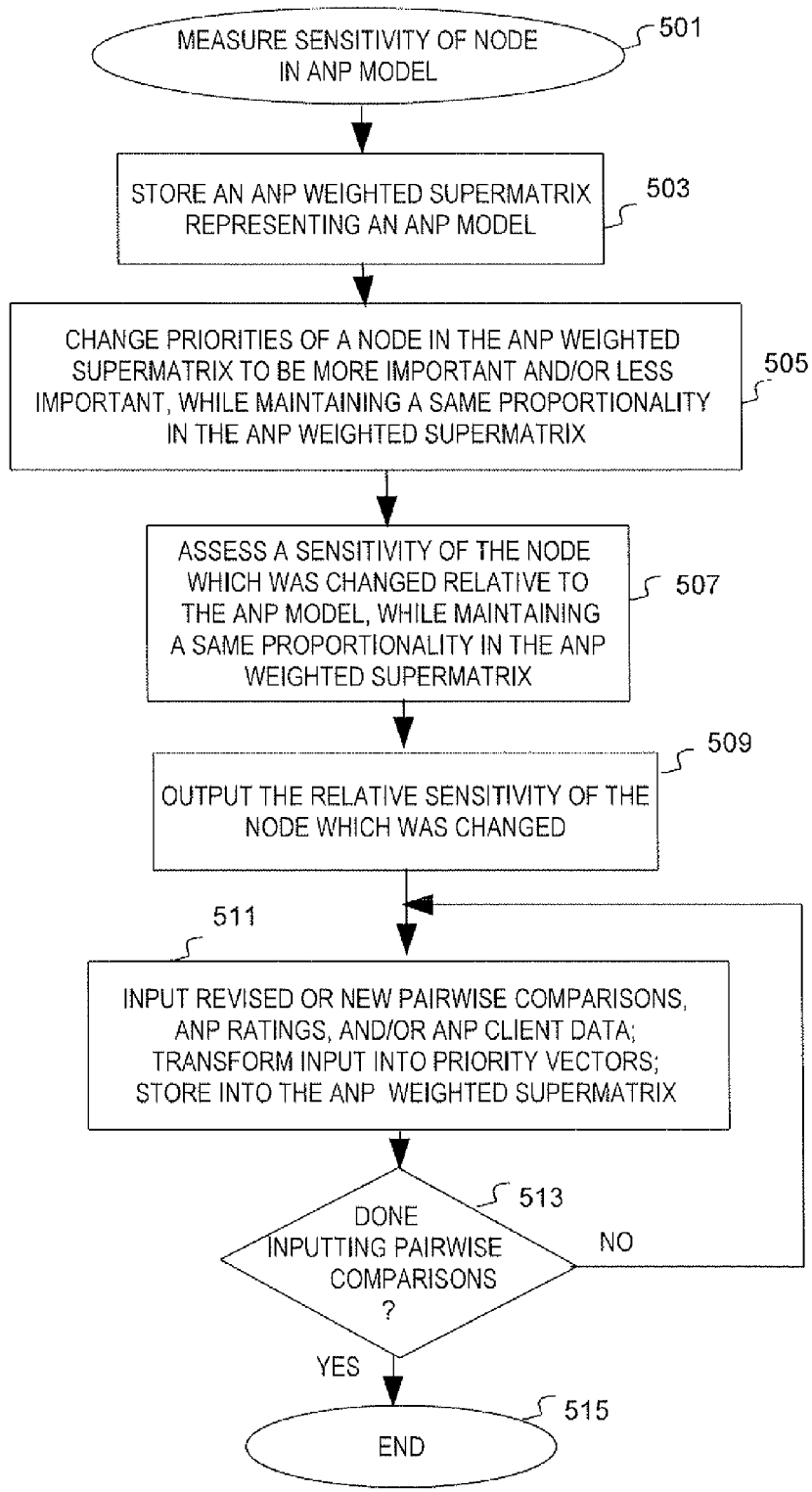
FIG. 5 is a flow chart illustrating a procedure to measure sensitivity of a node in an ANP model.
Figure 6:
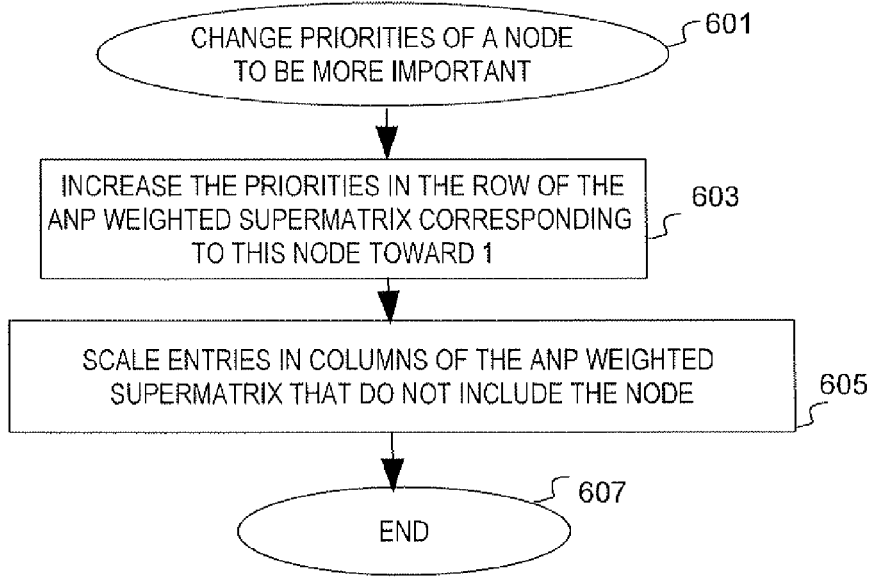
FIG. 6 is a flow chart illustrating a procedure to change priorities of a node to be more important.
Figure 7:
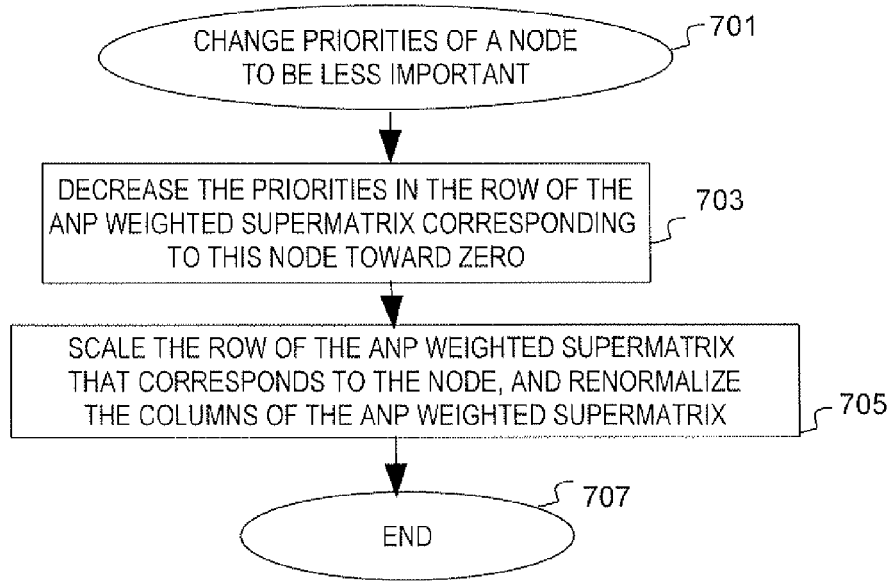
FIG. 7 is a flow chart illustrating a procedure to change priorities of a node to be less important.

FIG. 5, FIG. 6 and FIG. 7 together illustrate a procedure to measure sensitivity of a node in an ANP model, with FIG. 6 and FIG. 7 providing more detail on changing priorities of a node to be more important and to be less important, respectively. For example, FIG. 6 and FIG. 7 might be implemented as a subroutine(s) called by FIG. 5.

Referring now to FIG. 5, a flow chart illustrating a procedure 501 to measure sensitivity of a node in an ANP model will be discussed and described. The procedure can advantageously be implemented on, for example, a processor of a controller, described in connection with FIG. 4 or other apparatus appropriately arranged. In overview, FIG. 5 can store 503 an ANP weighted supermatrix representing an ANP model; change priorities 505 of a node in the ANP weighted supermatrix to be more important and/or less important, while maintaining a same proportionality in the ANP weighted supermatrix; assess 507 a sensitivity of the node which was changed relative to the ANP model, while maintaining a same proportionality in the ANP weighted supermatrix 507; output 509 the relative sensitivity of the node which was changed; and loop 513 to input revised or new pairwise comparisons, rating, and/or ANP client data into the ANP weighted supermatrix. Each of these is discussed in more detail below, although details which were discussed previously may be omitted from the following.

The process 501 can store 503 an ANP weighted supermatrix representing an ANP model. Before storing the ANP weighted supermatrix, values in the ANP weighted supermatrix can be obtained from an ANP model, for example, by inputting pairwise comparisons and creating an ANP weighted supermatrix therefrom, through various known techniques.

The process 501 can change priorities 505 of a node in the ANP weighted supermatrix to be more important and/or less important, while maintaining a same proportionality in the ANP weighted supermatrix. This has been discussed above in detail. FIG. 6 illustrates a process for changing priorities to be more important, and FIG. 7 illustrates a process for changing priorities to be less important. Although the priorities are perturbed, the proportionality in the ANP weighted supermatrix of the unperturbed nodes to each other is maintained, as well as some proportionality in that row. Section 2.4 and Section 4 are examples of way to maintain proportionality although the priorities of the node were changed.

The process 501 can assess 507 a sensitivity of the node which was changed relative to the ANP model, while maintaining a same proportionality in the ANP weighted supermatrix. Synthesized priorities of the alternatives of the ANP weighted supermatrix can be determined after the perturbation, while maintaining the same proportionality of the ANP weighted supermatrix (except for the perturbed node). For example, the synthesized priorities can be determined before the perturbation, and then the priorities of the node are perturbed before the limit matrix can be again calculated with the perturbed priorities. Then, for example, the difference in synthesized priorities before and after the perturbation can provide a measure of the sensitivity of the node which is perturbed, with respect to the ANP model. The closer the synthesized priorities value is to 1, the more sensitive is the node, whereas a value closer to zero reflects a less sensitive node.

The process 501 can output 509 the relative sensitivity of the node which was changed. For example, the sensitivity value can be output. The value can be shown as part of a representation of a supermatrix, as part of a conventional bar graph, as part of another graph, and/or a standalone value. Similarly, the sensitivity can be output in a visual representation. A user can make a decision regarding changes to the ANP model, for example based on the sensitivity of the node which are output.

The process 501 can loop 513 to input revised or new pairwise comparisons, rating, and/or ANP client data into the ANP weighted supermatrix. This can be done in accordance with known techniques for modifying data in an ANP, such as by interacting with a user. The process 501 can input 511 pairwise comparisons, ANP ratings, and/or ANP client data. The user interface side of inputting pairwise comparisons, ratings, or client data can be performed according to known techniques. For example, the process 501 can query the user to input, "with respect to opportunities, which is more important: social or political?" to input values of a pairwise comparison of the social and political opportunities nodes. Also, the process 501 can transform the input values into priority vectors in accordance with known techniques. Further, the process 501 can store the new or modified input values and the priority vectors into the ANP model. The process can loop to repeat if not done 513 inputting pairwise comparisons, or can finish at an end 515.

Referring now to FIG. 6, a flow chart illustrating a procedure 601 to change priorities of a node to be more important will be discussed and described. The procedure 601 can increase 603 the priorities in the row of the ANP weighted supermatrix corresponding to this node toward a value of 1. Hence, a weight of the node in the ANP weighted supermatrix is increased. Meanwhile, the procedure 601 can scale 605 the entries in columns of the ANP weighted supermatrix that do not include the node. This has been discussed in more detail above, and will not be repeated here. Then, the procedure can end 607.

Referring now to FIG. 7, a flow chart illustrating a procedure 701 to change priorities of a node to be less important will be discussed and described. The procedure 701 can decrease 703 the priorities in the row of the ANP weighted supermatrix corresponding to this node toward a value of zero. Hence, a weight of the node in the ANP weighted supermatrix is decreased. Meanwhile, the procedure 701 can scale 705 the row of the ANP weighted supermatrix that corresponds to the node, and then renormalize the columns of the ANP weighted supermatrix. This has been discussed in more detail above, and will not be repeated here. Then, the procedure can end 707.

Referring now to FIG. 8, an illustration of an ANP model will be discussed and described. The illustration is simplified for ease of discussion. In the ANP model, there are conventionally provided control criteria that are benefits, costs, opportunities, and risks (commonly abbreviated BOCR). At the top of the ANP model 800, there is provided an ANP model goal 801, benefits 803a and opportunities 803b. (The usual costs and risks are not shown.) The benefits 803a is a node that includes a one way directional link from the benefits 803a node to the social benefits node 805a and the political benefits node 805b. The opportunities 803b is a node that includes a one way directional link from the opportunities 803b node to the social opportunities node 805c and the political opportunities node 805d. The political benefits node 805b includes a one way directional connection to the benefits node 803a and the opportunities node 803b. Each of the social benefits node 805a, the political benefits node 805b, the social opportunities node 805c and the political opportunities node 805d includes a separate one-way directional connection to alternative 1 811a and alternative 2 811c.

In a conventional ANP model, the connection defines how important the destination node is to the source node. Hence, a connection is directional, that is, it has a from direction and a to direction. For example, a connection from the conventional ANP model goal 801 to the benefits node 803a means that the user can define how important benefits are to the goal.

One of skill in this art will know that the ANP model can be represented as a matrix (or series of matrices), where a node is represented as a row in the matrix.

The concept of row sensitivity opens up many avenues of analysis not previously available in ANP theory. For instance, there is influence analysis, i.e. which node is most influential to the decision the ANP model is making. Another example would be perspective analysis, which tells how important the alternatives would be if a single node was the only one in the model with weight (however we do not forget the rest of the model in this calculation). Yet another example is marginal analysis, that is, what are the rates of influence of each of the nodes (a derivative calculation). A final example applying row sensitivity would be search for highest rank influence (that is, which node causes rank change first).

The designations in the following list are defined and expressly used herein as would be understood to one of skill in the ANP art, and not according to a general dictionary, whether singular or plural: "priority," "node", "importance" (or "important"), "sensitivity," "pairwise comparison", "ANP ratings" (or "ratings"), "ANP client data", "priority vectors", "judgment of priority," "ANP alternatives" (or "alternatives"), "criteria", "weight," "cluster," "local," "global," "synthesize." This list is not exhaustive and does not imply that a term not on this list can be interpreted according to a general dictionary instead of according to an understood ANP meaning. Some of these are further explained below for the reader's convenience.

"Pairwise comparison." The point of a pairwise comparison set is to arrive at the priorities of a group of things. These things may be criteria (so-called "alternatives" in the traditional ANP sense), or ratings scales. In a classic example of doing pairwise comparisons, one can answer the question, "how many times better is X than Y" for all X and Y being compared.

"ANP Ratings." If one thinks of a single column of the conventional ANP's rating system as conventionally represented in a matrix, its point is to assign ideal priorities to the alternatives (with respect to a criteria). The ratings prioritize alternatives in a set of alternatives. In a classic example of doing ANP ratings, one first sets up ratings words like "High", "Medium" and "Low", and gives scores to those words; then each of the things being rated is assigned a "High", "Medium" or "Low."

"ANP client data." ANP client data are data that represent real world values. For example, in a decision about an automobile purchase, ANP client data could be miles per gallon, number of passengers, headroom, cubic size of storage, etc.

The term "analytic network process" ("ANP") model, sometimes referred to as an ANP network model, an ANP network or similar, is defined herein to refer to a form of an analytic hierarchy process (AHP) in which values for higher level elements are affected by lower level elements and take the dependency of the lower level elements into account; further in the ANP model, the importance of the criteria determines the importance of the alternatives (as in an AHP); the importance of the alternatives themselves determines the importance of the criteria; further, the ANP model additionally has influence flowing between non-downward elements (in comparison to a conventional AHP model, in which influence flows only downwards); further the ANP model is a network, that is not a top-down-tree, of priorities and alternative choices. The terms "criteria" and "alternatives" are understood to those of skill in the AHP art. An ANP is further discussed in, e.g., Saaty, T. L. (2001) *Decision Making with Dependence and Feedback: the Analytic Network Process*, $2^{nd}$ edition.

The term "ANP weighted supermatrix" is defined as the supermatrix which is created from the ANP model, and which has been weighted, in accordance with ANP theory, and variations, extensions, and/or evolutions of such ANP theory. The ANP supermatrix is understood to be represented in rows and columns.

The above is sometimes described in terms of a single user, for ease of understanding and illustration. However, it is understood that multiple users can be accommodated in various embodiments. For example, multiple users each can input pairwise comparisons.

Furthermore, the devices of interest may include, without being exhaustive, general purpose computers, specially programmed special purpose computers, personal computers, distributed computer systems, calculators, handheld computers, keypads, laptop/notebook computers, mini computers, mainframes, super computers, personal digital assistants, communication devices, any of which can be referred to as a "computer", as well as networked combinations of the same, and the like, although other examples are possible as will be appreciated by one of skill in the art, any of which can be referred to as a "computer-implemented system."

One or more embodiments may rely on the integration of various components including, as appropriate and/or if desired, hardware and software servers, database engines, and/or other content providers. One or more embodiments may be connected over a network, for example the Internet, an intranet, a wide area network (WAN), a local area network (LAN), or even on a single computer system. Moreover, portions can be distributed over one or more computers, and some functions may be distributed to other hardware, in accordance with one or more embodiments.

Any presently available or future developed computer software language and/or hardware components can be employed in various embodiments. For example, at least some of the functionality discussed above could be implemented using C, C++, Java or any assembly language appropriate in view of the processor being used.

One or more embodiments may include a process and/or steps. Where steps are indicated, they may be performed in any order, unless expressly and necessarily limited to a particular order. Steps that are not so limited may be performed in any order.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An apparatus comprising:
an analytic network process (ANP) storage memory that stores an ANP weighted supermatrix representing an ANP model; and
a processor in communication with the ANP storage memory, the processor being configured to facilitate
changing priorities of a node in the ANP weighted supermatrix to be more important, and changing priorities of the node in the ANP weighted supermatrix to be less important;
assessing a sensitivity of the node itself which was changed relative to the ANP model; and
maintaining a same proportionality in the ANP weighted supermatrix for the changing of the priorities and the assessing of the relative sensitivity,
wherein the sensitivity of the node itself is assessed by changing, by a same predetermined amount, each entry throughout a same row of the node of the ANP weighted supermatrix and consequently rescaling the rest of the entries in a column of the ANP weighted supermatrix that corresponds to the node being assessed,
the changing comprising, for all $0 \leq p \leq 1$, defining $F_{W,r,p_0}(p)$ by changing the $r^{th}$ row and then rescaling the remaining entries in the columns so that the columns continue to add to one;
rescaling to be less important comprising, for $0 \leq p \leq p_0$, changing the $r^{th}$ row by scaling it by $$\frac{p}{p_0};$$

rescaling to be more important comprising, for $p_0 \leq p \leq 1$, changing the entries in the $r^{th}$ row consistent with the following formula $$F_{W,r,p_0}(p)_{r,j} = 1 - \alpha(1 - W_{r,j})$$

where $$\alpha = \frac{1-p}{1-p_0};$$

where
the ANP model M is fixed,
W is a weighted supermatrix of the ANP model M whose dimensions are n×n,
r is a row and is an integer fixed between 1 and n,
j is a column,
p is a parameter value and $p_0$ is an initial value of p, $0 < p_0 < 1$,
$F_{W,r,p_0}:[0,1] \to M_{n,n}([0,1])$ is a family F of perturbations of W in the $r^{th}$ row, and
trivial columns are left unchanged throughout the family of row perturbations of the ANP model.

2. The apparatus of claim 1, the priorities of the node being changed to be more important by increasing the priorities toward 1, and scaling entries in other columns that do not include the node.

3. The apparatus of claim 1, the priorities of the node being changed to be less important by decreasing the priorities toward 0, scaling a row corresponding to the node, and renormalizing the columns.

4. An apparatus comprising:
an analytic network process (ANP) storage memory that stores an ANP weighted supermatrix representing an ANP model; and
a processor in communication with the ANP storage memory, the processor being configured to facilitate
changing priorities of a node in the ANP weighted supermatrix to be more important, and changing priorities of the node in the ANP weighted supermatrix to be less important;
assessing a sensitivity of the node itself which was changed relative to the ANP model; and
maintaining a same proportionality in the ANP weighted supermatrix for the changing of the priorities and the assessing of the relative sensitivity,
wherein the sensitivity of the node itself is assessed by changing, by a same predetermined amount, each entry throughout a same row of the node of the ANP weighted supermatrix and consequently rescaling the rest of the entries in a column of the ANP weighted supermatrix that corresponds to the node being assessed,
the changing to be less important comprising, when $0 \leq p \leq p_0$, defining $F_{W,r,p_0}(p)$ by scaling the $r^{th}$ row by $$\frac{p}{p_0},$$

and renormalizing the columns;
the changing to be more important comprising, when $p_0 \leq p \leq 1$, defining $F_{W,r,p_0}(p)$ by leaving alone columns of W for which $W_{r,i} = 0$ and scaling all entries in the other columns, except for the entry in the $r^{th}$ row, by $$\frac{1-p}{1-p_0};$$

where
the ANP model M is fixed,
W is a weighted supermatrix of the ANP model M whose dimensions are n×n,
r is an integer fixed between 1 and n,
the $r^{th}$ row is the row corresponding to the node,
i is a column,
p is a parameter value and $p_0$ is an initial value of p, $0 < p_0 < 1$, $F_{W,r,p_0}:[0;1] \to M_{n,n}([0,1])$ is a family F of perturbations of W in the $r^{th}$ row, and trivial columns are left unchanged throughout the family of row perturbations of the ANP model.

5. The apparatus of claim 1, further comprising:

an output unit in communication with the processor and configured to output, for a display to a user, the relative sensitivity of the node which was changed.

6. The apparatus of claim 1, further comprising an input unit configured to input, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

7. A method, comprising:

storing, in an analytic network process (ANP) storage memory, an ANP weighted supermatrix representing an ANP model;

in a processor in communication with the ANP storage memory, changing priorities of a node in the ANP weighted supermatrix to be more important;

assessing a sensitivity of the node itself which was changed relative to the ANP model; and maintaining a same proportionality in the ANP weighted supermatrix for the changing of the priorities and the assessing of the relative sensitivity, wherein the sensitivity of the node itself is assessed by changing, by a same predetermined amount, each entry throughout a same row of the node of the ANP weighted supermatrix and consequently rescaling the rest of the entries in a column of the ANP weighted supermatrix that corresponds to the node being assessed, the changing comprising, for all $0 \le p \le 1$, defining $F_{W,r,p_0}(p)$ by changing the $r^{th}$ row and then rescaling the remaining entries in the columns so that the columns continue to add to one;

rescaling to be more important comprising, for $p_0 \le p \le 1$, changing the entries in the $r^{th}$ row consistent with the following formula $$f(p) = F_{W,r,p_0}(p)_{r,j} = 1 - \alpha(1 - W_{r,j})$$

where $$\alpha = \frac{1-p}{1-p_0};$$

where the ANP model M is fixed,

W is a weighted supermatrix of the ANP model M whose dimensions are n×n, r is a row and is an integer fixed between 1 and n, j is a column, p is a parameter value and $p_0$ is an initial value of p, $0 < p_0 < 1$, $F_{W,r,p_0}:[0;1] \to M_{n,n}([0,1])$ is a family F of perturbations of W in the $r^{th}$ row, and trivial columns are left unchanged throughout the family of row perturbations of the ANP model.

8. The method of claim 7, the priorities of the node being changed to be more important by increasing the priorities toward 1, and scaling entries in other columns that do not include the node.

9. The method of claim 7, further comprising changing priorities of the node in the ANP weighted supermatrix to be less important, the priorities of the node being changed to be less important by decreasing the priorities toward 0, scaling a row corresponding to the node, and renormalizing the columns.

10. A method, comprising:

storing, in an analytic network process (ANP) storage memory, an ANP weighted supermatrix representing an ANP model;

in a processor in communication with the ANP storage memory, changing priorities of a node in the ANP weighted supermatrix to be more important;

assessing a sensitivity of the node itself which was changed relative to the ANP model; and maintaining a same proportionality in the ANP weighted supermatrix for the changing of the priorities and the assessing of the relative sensitivity, wherein the sensitivity of the node itself is assessed by changing, by a same predetermined amount, each entry throughout a same row of the node of the ANP weighted supermatrix and consequently rescaling the rest of the entries in a column of the ANP weighted supermatrix that corresponds to the node being assessed, the changing to be more important comprising, when $p_0 \le p \le 1$, defining $F_{W,r,p_0}(p)$ by leaving alone columns of W for which $W_{r,i} = 0$ and scaling all entries in the other columns, except for the entry in the $r^{th}$ row, by $$\frac{1-p}{1-p_0};$$

where the ANP model M is fixed,

W is a weighted supermatrix of the ANP model M whose dimensions are n×n, r is an integer fixed between 1 and n, the $r^{th}$ row is the row corresponding to the node, i is a column, p is a parameter value and $p_0$ is an initial value of p, $0 < p_0 < 1$, $F_{W,r,p_0}:[0;1] \to M_{n,n}([0,1])$ is a family F of perturbations of W in the $r^{th}$ row, and trivial columns are left unchanged throughout the family of row perturbations of the ANP model.

11. The method of claim 7, further comprising:

outputting, to an output unit in communication with the processor, the relative sensitivity of the node which was changed.

12. The method of claim 7, further comprising inputting, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

13. A non-transitory computer-readable storage medium encoded with a computer executable instructions, wherein execution of said computer executable instructions by one or more processors causes a computer to perform the steps of:
- storing, in an analytic network process (ANP) storage memory, an ANP weighted supermatrix representing an ANP model;
- changing priorities of a node in the ANP weighted supermatrix to be less important;
- assessing a sensitivity of the node itself which was changed relative to the ANP model; and
- maintaining a same proportionality in the ANP weighted supermatrix for the changing of the priorities and the assessing of the relative sensitivity,
  - wherein the sensitivity of the node itself is assessed by changing, by a same predetermined amount, each entry throughout a same row of the node of the ANP weighted supermatrix and consequently rescaling the rest of the entries in a column of the ANP weighted supermatrix that corresponds to the node being assessed,
- further comprising changing the priorities of the node to be more important,
- the changing comprising, for all $0 \leq p \leq 1$, defining $F_{W,r,p_0}(p)$ by changing the $r^{th}$ row and then rescaling the remaining entries in the columns so that the columns continue to add to one;
- rescaling to be less important comprising, for $0 \leq p \leq p_0$, changing the $r^{th}$ row by scaling it by $$\frac{p}{p_0};$$

- rescaling to be more important comprising, for $p_0 \leq p \leq 1$, changing the entries in the $r^{th}$ row consistent with the following formula $$F_{W,r,p_0}(p)_{r,j} = 1 - \alpha(1 - W_{r,j})$$

where $$\alpha = \frac{1-p}{1-p_0};$$

where
the ANP model M is fixed,
W is a weighted supermatrix of the ANP model M whose dimensions are n×n,
r is a row and is an integer fixed between 1 and n,
j is a column,
p is a parameter value and $p_0$ is an initial value of p, $0 < p_0 < 1$,
$F_{W,r,p_0}: [0; 1] \rightarrow M_{n,n}([0, 1])$ is a family F of perturbations of W in the $r^{th}$ row, and
trivial columns are left unchanged throughout the family of row perturbations of the ANP model.

14. The computer readable storage medium of claim 13, further comprising changing the priorities of the node to be more important, the priorities of the node being changed to be more important by increasing the priorities toward 1, and scaling entries in other columns that do not include the node.

15. The computer readable storage medium of claim 13, the priorities of the node being changed to be less important by decreasing the priorities toward 0, scaling a row corresponding to the node, and renormalizing the columns.

16. A non-transitory computer-readable storage medium encoded with a computer executable instructions, wherein execution of said computer executable instructions by one or more processors causes a computer to perform the steps of:
- storing, in an analytic network process (ANP) storage memory, an ANP weighted supermatrix representing an ANP model;
- changing priorities of a node in the ANP weighted supermatrix to be less important;
- assessing a sensitivity of the node itself which was changed relative to the ANP model; and
- maintaining a same proportionality in the ANP weighted supermatrix for the changing of the priorities and the assessing of the relative sensitivity,
  - wherein the sensitivity of the node itself is assessed by changing, by a same predetermined amount, each entry throughout a same row of the node of the ANP weighted supermatrix and consequently rescaling the rest of the entries in a column of the ANP weighted supermatrix that corresponds to the node being assessed,
- the changing to be less important comprising, when $0 \leq p \leq p_0$, defining $F_{W,r,p_0}(p)$ by scaling the $r^{th}$ row by $$\frac{p}{p_0},$$

and renormalizing the columns;
- further comprising changing the priorities of the node to be more important, the changing to be more important comprising, when $p_0 \leq p \leq 1$, defining $F_{W,r,p_0}(p)$ by leaving alone columns of W for which $W_{r,i}=0$ and scaling all entries in the other columns, except for the entry in the $r^{th}$ row, by $$\frac{1-p}{1-p_0};$$

where
the ANP model M is fixed,
W is a weighted supermatrix of the ANP model M whose dimensions are n×n,
r is an integer fixed between 1 and n,
the $r^{th}$ row is the row corresponding to the node,
i is a column,
p is a parameter value and $p_0$ is an initial value of p, $0 < p_0 < 1$,
$F_{W,r,p_0}: [0; 1] \rightarrow M_{n,n}([0, 1])$ is a family F of perturbations of W in the $r^{th}$ row, and
trivial columns are left unchanged throughout the family of row perturbations of the ANP model.

17. The computer readable storage medium of claim 13, further comprising instructions for:
- outputting, to an output unit in communication with the processor, the relative sensitivity of the node which was changed.

18. The computer readable storage medium of claim 13, further comprising instructions for:
- inputting, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

* * * * *